(12) United States Patent
Cucci et al.

(10) Patent No.: US 8,834,093 B2
(45) Date of Patent: Sep. 16, 2014

(54) SYSTEM AND METHOD FOR COLLECTING, AUGMENTING AND CONVERTING WIND POWER

(76) Inventors: Peter J. Cucci, Flemington, NJ (US); Francis X. Smollon, Lawrenceville, NJ (US)

(*) Notice: Subject to any disclaimer, the term of this patent is extended or adjusted under 35 U.S.C. 154(b) by 863 days.

(21) Appl. No.: 12/927,707

(22) Filed: Nov. 22, 2010

(65) Prior Publication Data

US 2011/0135443 A1    Jun. 9, 2011

Related U.S. Application Data

(60) Provisional application No. 61/281,671, filed on Nov. 20, 2009, provisional application No. 61/281,637, filed on Nov. 20, 2009.

(51) Int. Cl.
*F03B 15/06* (2006.01)
*F03D 7/00* (2006.01)
*F03D 3/02* (2006.01)
*F03D 3/04* (2006.01)

(52) U.S. Cl.
CPC . *F03D 3/02* (2013.01); *Y02E 10/74* (2013.01); *F03D 3/0427* (2013.01); *F05B 2240/132* (2013.01); *Y10S 415/905* (2013.01)
USPC ............................... 415/4.1; 415/905

(58) Field of Classification Search
USPC ......... 416/6; 415/2.1, 4.1, 93, 94, 148, 182.1, 415/905, 909, 911; 290/42, 43, 44, 53, 54, 290/55
See application file for complete search history.

(56) References Cited

U.S. PATENT DOCUMENTS

| | | | |
|---|---|---|---|
| 4,084,918 A * | 4/1978 | Pavlecka | ........................... 415/1 |
| 4,389,158 A | 6/1983 | Nakanishi | |
| 4,516,907 A | 5/1985 | Edwards | |
| 4,600,360 A | 7/1986 | Quarterman | |
| 5,009,569 A * | 4/1991 | Hector et al. | .................. 415/4.1 |
| 5,447,412 A * | 9/1995 | Lamont | ......................... 415/4.2 |
| 7,215,036 B1 | 5/2007 | Gehring | |
| 7,713,020 B2 * | 5/2010 | Davidson et al. | ................. 415/1 |

FOREIGN PATENT DOCUMENTS

WO    WO2009/116999    9/2009

\* cited by examiner

*Primary Examiner* — Edward Look
*Assistant Examiner* — Christopher J Hargitt
(74) *Attorney, Agent, or Firm* — Keene IP Law, LLC

(57) ABSTRACT

A system, apparatus, and method for collecting and concentrating an airstream for converting into mechanical or electrical energy, includes an elongated housing structure, including an airstream inlet chamber, a central chamber, and an airstream outlet chamber, and an ancillary airstream injector sub-system.

20 Claims, 19 Drawing Sheets

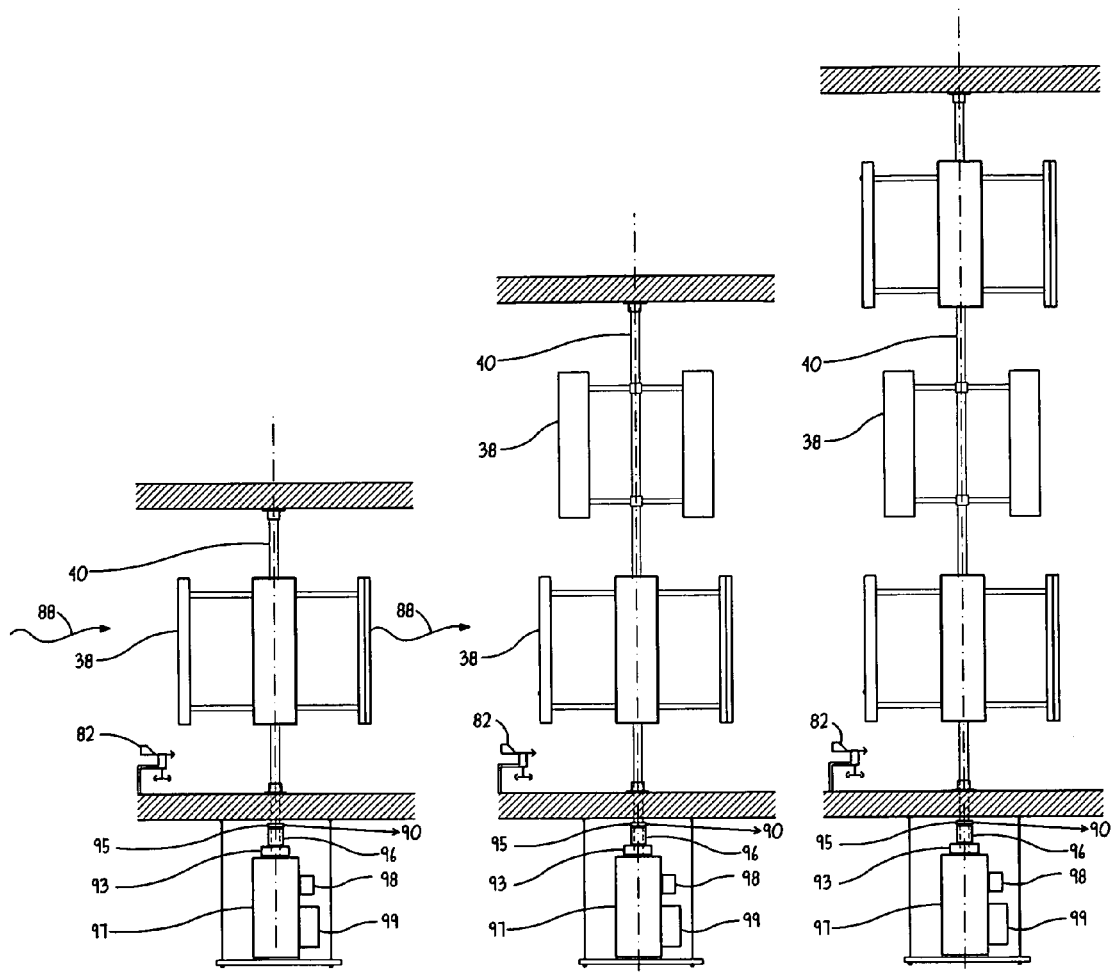
FIGURE 26a  FIGURE 27a  FIGURE 28a
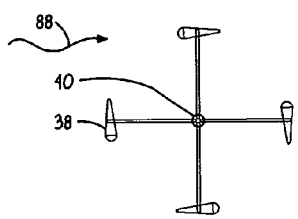 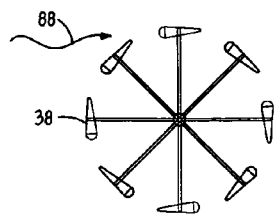 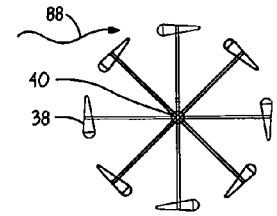
FIGURE 26b  FIGURE 27b  FIGURE 28b

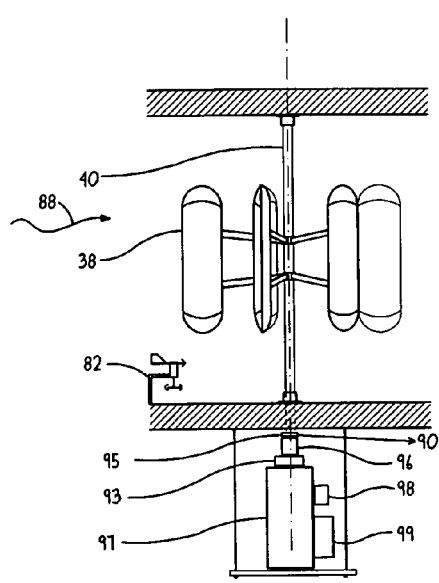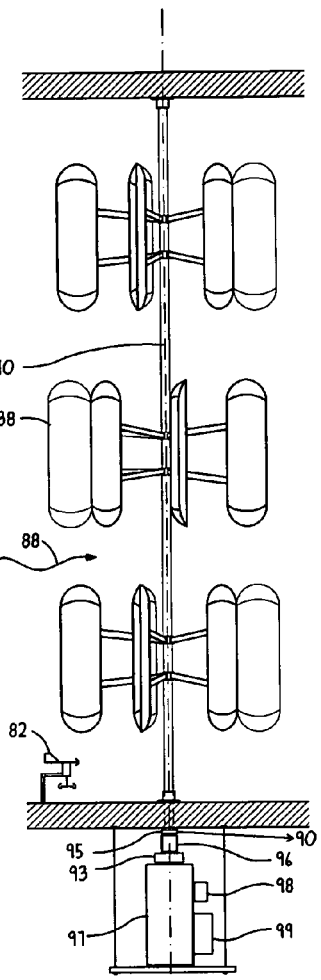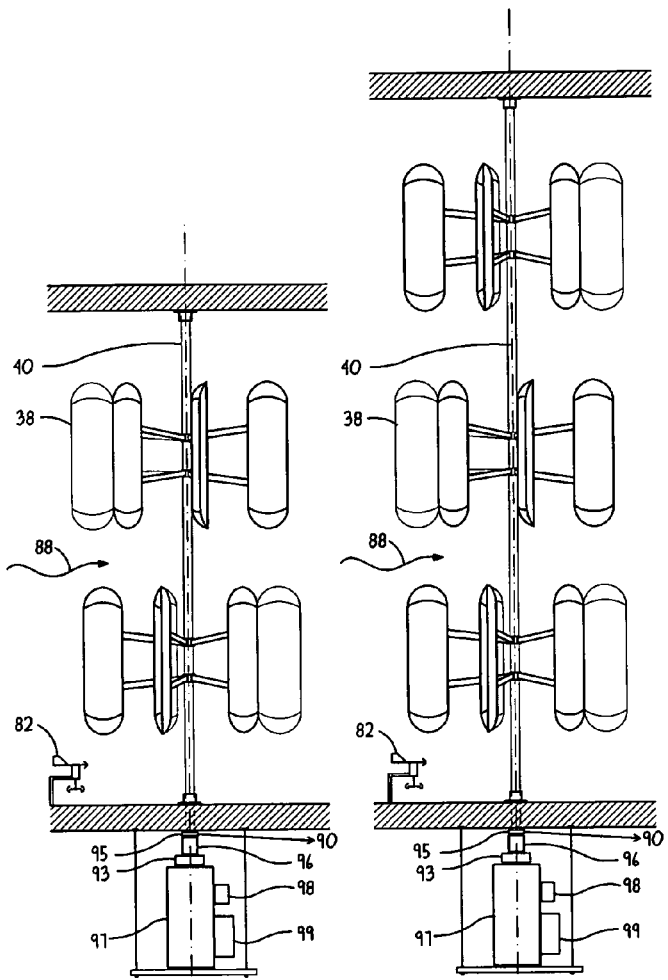
FIGURE 29a          FIGURE 30a          FIGURE 31a
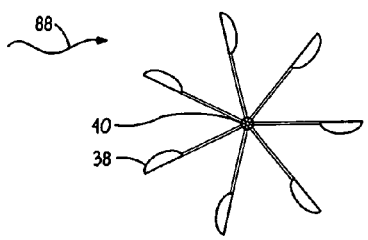  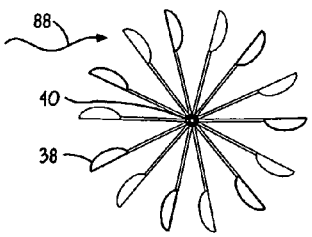  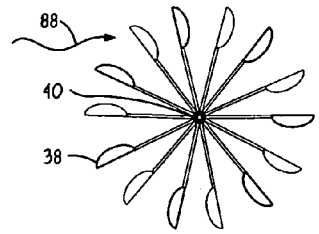
FIGURE 29b          FIGURE 30b          FIGURE 31b

SYSTEM AND METHOD FOR COLLECTING, AUGMENTING AND CONVERTING WIND POWER

RELATED APPLICATIONS

This application claims the benefit of U.S. Provisional Application No. 61/281,671, filed on Nov. 20, 2009, the entire disclosure of which is hereby incorporated by reference herein. This application also relates to co-pending application Ser. No. 12/927,709, titled: CONTROL SYSTEM AND METHOD FOR CONTROLLING WIND POWER GENERATION PLANT filed on even date herewith, which claims the benefit of U.S. Provisional Application No. 61/281,637, filed on Nov. 20, 2009, the entire disclosures of which are hereby incorporated by reference herein.

BACKGROUND OF THE INVENTION

1. Field of the Invention

This invention relates generally to systems and methods for providing electrical energy generation through wind power, and more particularly, to systems and methods for collecting, augmenting, and converting wind power to mechanical or electrical energy.

2. Background Information

The conversion of the energy in a wind stream to electricity can be accomplished through the use of wind turbines whose rotors (or blades or impellers) are coupled to a shaft for rotation. The force of an airstream against the surface of the rotors of the turbine causes the shaft to turn, which in turn provides rotary mechanical power that can be utilized to drive one or more generators to produce electricity.

As a fuel source for the production of mechanical power, which in turn can be converted into electricity, the energy of the wind has two main advantages over fossil derived resources, for example, oil, natural gas and coal, because it is inexhaustible and freely available. Although it is freely available, wind energy is also an intermittent resource, and it varies greatly, both in velocity and the direction from which it emanates, even over the course of short periods of time.

Wind turbine technological advancement has followed two paths of development, HAWT (Horizontal Axis Wind Turbine) and VAWT (Vertical Axis Wind Turbine), with HAWT technology dominating the industry. The advantage that HAWT technology has over VAWT is that it is eminently scalable into larger, higher, more powerful applications. The basic underpinning behind HAWT development has been to place larger rotors, which equates to more energy being harvested from the air stream, at greater altitudes where the higher wind velocity allows for greater productivity.

The inherent physical limitations of VAWT technology prevents following the path of 'ever-larger' scalability of singular turbines. Past attempts to scale VAWT turbines to larger sizes have been stymied due to the challenges the basic laws of physics place upon the technology.

Regardless of the various configurations utilized by recent VAWT developers, vertical-axis technology is constrained to an operational realm that is fairly close to ground level. At this point in time, the prevailing practice within the vertical-axis industry is the placement of turbines on the rooftops of apartment, retail and industrial buildings to take advantage of building height.

The major disadvantage of vertical-axis technology, i.e., the requirement that VAWT installations be built close to ground level, also presents product developers with two major opportunities or advantages, the first being the ability to construct 'ground based' structures that can serve to capture and concentrate elements of the airstream and focus it upon the impellers of wind power generation plants lodged within said structures. A second opportunity afforded to VAWT developers is locating mechanical systems of the wind power generation plant close to the ground, allowing for easy access for purposes of repair and maintenance.

The ability to construct ground based installations that can serve to capture and concentrate portions of the passing airstream is enhanced in mountainous regions, where the contoured terrain serves to naturally augment and focus the wind stream. In mountainous regions, the wind resource is often stronger closer to the ground than at higher altitudes. In these areas, VAWT wind power generation plants, lodged within structures as described above, have the potential to exhibit production profiles that are equal to, or greater than, the most efficient installations of the utility scale HAWT technology.

An additional issue that must be taken into account, when attempting to capitalize upon the fact that mountainous regions often have stronger wind power resources closer to ground level, is that the same physical features that produce this effect, ridgelines, passage gaps, bluffs, and other structures, are a very individualized resource, with many specific nuances and peculiarities related to the wind patterns at any particular location.

There remains a need for capturing, augmenting, and focusing elements of air streams to convert wind power to mechanical or electrical energy.

BRIEF DESCRIPTION OF THE DRAWINGS

Throughout the drawings, like reference numerals are used to indicate common features of the described devices.

FIGS. 26a-28b are cross-sectional views of a wind power generation plant with one or more H-type turbines according to an aspect of the invention;

FIGS. 29a-31b are cross-sectional views of a wind power generation plant with one or more H-type turbines according to an aspect of the invention.

Figure 1:
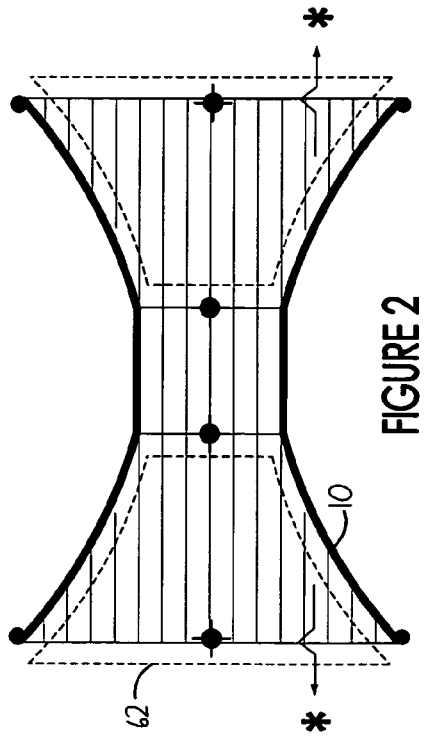
FIG. 1 is a top plan view of the system illustrating a rectilinear structure according to an aspect of the invention.
Figure 2:
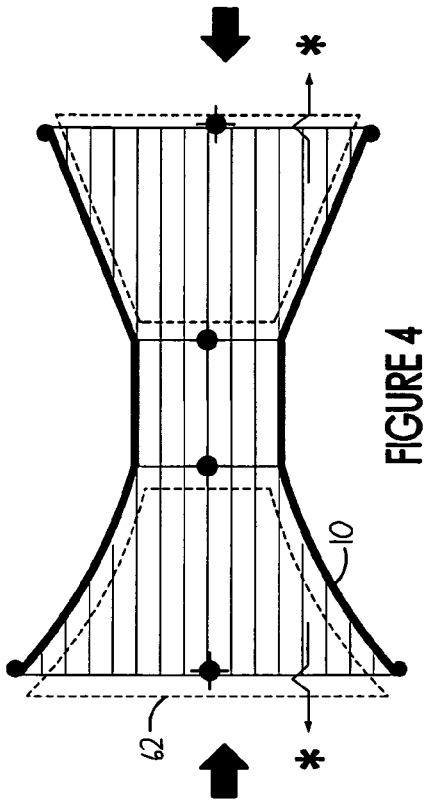
FIG. 2 is a top plan view of the system illustrating a curvilinear structure according to an aspect of the invention.
Figure 3:
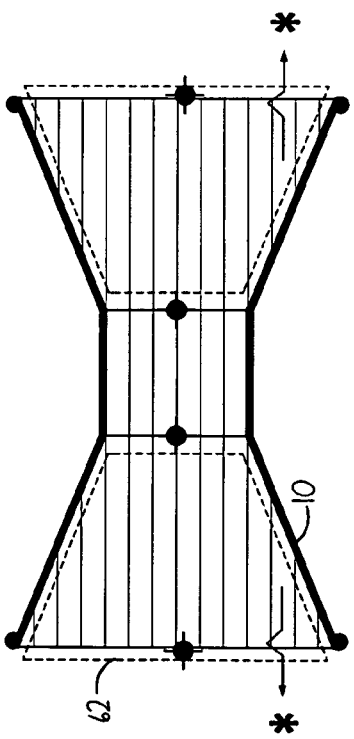
FIG. 3 is a top plan view of the system illustrating an hourglass-shaped structure according to an aspect of the invention.

The above-identified drawing figures set forth several preferred embodiments of the invention. Other embodiments are also contemplated, as disclosed herein. The disclosure represents the invention, but is not limited thereby, as it should be understood that numerous other modifications and embodiments may be devised by those skilled in the art which fall within the scope and spirit of the invention as claimed.

SUMMARY OF THE INVENTION

Briefly described, according to an aspect of the invention, a bi-directional system for collecting, augmenting, and converting wind energy includes an open-ended elongated housing, the housing including a ceiling, a floor, and oppositely disposed side walls, the elongated housing forming an airstream inlet chamber with an intake opening for collecting an airstream, the airstream inlet chamber including a first and second array of selectively adjustable louver panels forming oppositely disposed first and second side walls of the housing and an internal outlet through which a collected airstream passes; a central chamber for housing a plurality of turbines, and for receiving a collected airstream from the internal outlet of the airstream inlet chamber, the plurality of turbines being rotatably coupled to an axis of rotation, the central chamber including a third and fourth array of selectively adjustable louver panels forming oppositely disposed third and fourth side walls of the housing; an airstream outlet chamber with an internal inlet through which a collected airstream passes from the central chamber, the airstream outlet chamber including a fifth and sixth array of selectively adjustable louver panels forming oppositely disposed fifth and sixth side walls, and an outlet opening; an ancillary airstream injector disposed on an outer surface of the ceiling and on an outer surface of the floor adjacent said airstream inlet chamber and the airstream outlet chamber for collecting an accelerated airstream; and a controller coupled to the axis of rotation and to the first, second, third, fourth, fifth and sixth array of adjustable louver panels for controlling movement of the adjustable louver panels and for converting the rotational energy output into mechanical or electrical energy.

Briefly described, according to an aspect of the invention, a bi-directional apparatus for collecting, augmenting, and converting wind energy includes an open-ended elongated housing, the housing including a ceiling, a floor, and oppositely disposed side walls, the elongated housing forming an airstream inlet chamber with an intake opening for collecting an airstream, the airstream inlet chamber including a first and second array of selectively adjustable louver panels forming oppositely disposed first and second side walls of the housing and an internal outlet through which a collected airstream passes; a central chamber for housing a plurality of turbines, and for receiving a collected airstream from the internal outlet of the airstream inlet chamber, the plurality of turbines being rotatably coupled to an axis of rotation, the central chamber including a third and fourth array of selectively adjustable louver panels forming oppositely disposed third and fourth side walls of the housing; an airstream outlet chamber with an internal inlet through which a collected airstream passes from the central chamber, the airstream outlet chamber including a fifth and sixth array of selectively adjustable louver panels forming oppositely disposed fifth and sixth side walls, and an outlet opening; an ancillary airstream injector disposed on an outer surface of the ceiling and on an outer surface of the floor adjacent said airstream inlet chamber and the airstream outlet chamber for collecting an accelerated airstream.

According to another aspect of the invention, a method for collecting, augmenting, and converting the energy of an airstream into mechanical or electrical energy includes the steps of: providing an open-ended elongated housing including a ceiling, a floor, and oppositely disposed side walls, collecting and concentrating an airstream through an airstream inlet chamber with an intake opening for collecting an airstream, the airstream inlet chamber including a first and second array of selectively adjustable louver panels forming oppositely disposed first and second side walls of the housing and an internal outlet through which a collected airstream passes; disposing an ancillary airstream injector on an outer surface of the ceiling and on an outer surface of the floor adjacent the airstream inlet chamber and the airstream outlet chamber for collecting an accelerated air stream; engaging a plurality of turbines disposed in a central chamber for receiving the collected airstream from the internal outlet of the airstream inlet chamber, the plurality of turbines being rotatably coupled to an axis of rotation, the central chamber including a third and fourth array of selectively adjustable louver panels forming oppositely disposed third and fourth side walls of the housing; and diffusing the collected and concentrated airstream through an airstream outlet chamber with an internal inlet through which the collected and concentrated airstream passes from the central chamber, the airstream outlet chamber including a fifth and sixth array of selectively adjustable louver panels forming oppositely disposed fifth and sixth side walls, and an outlet opening is also described.

DETAILED DESCRIPTION OF THE INVENTION

As used herein, the terms "comprises", "comprising", "includes", "including", "has", "having", or any other variation thereof, are intended to cover non-exclusive inclusions. For example, a process, method, article or apparatus that comprises a list of elements is not necessarily limited to only those elements but may include other elements not expressly listed or inherent to such process, method, article, or apparatus. In addition, unless expressly stated to the contrary, the term "of" refers to an inclusive "or" and not to an exclusive "or". For example, a condition A or B is satisfied by any one of the following: A is true (or present) and B is false (or not present); A is false (or not present) and B is true (or present); and both A and B are true (or present).

The terms "a" or "an" as used herein are to describe elements and components of the invention. This is done for convenience to the reader and to provide a general sense of the invention. The use of these terms in the description herein should be read and understood to include one or at least one. In addition, the singular also includes the plural unless indicated to the contrary. As used in this specification and the appended claims, the term "or" is generally employed in its sense including "and/or" unless the content clearly dictates otherwise.

Figure 4:
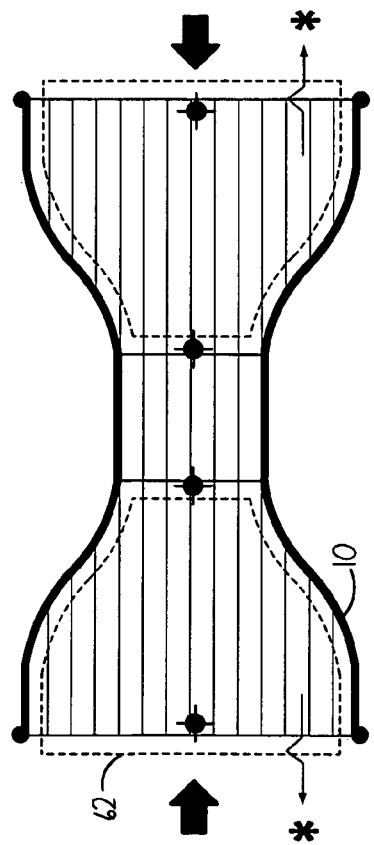
FIG. 4 is a top plan view of the system illustrating a combined curvilinear and rectilinear structure according to an aspect of the invention.

According to an aspect of the invention, a bi-directional system 100 for collecting, augmenting, accelerating, diverting, and converting wind energy is described. The system 100 includes an open-ended elongated housing structure 10. As illustrated in FIGS. 1-4, the housing structure 10 may have a substantially rectilinear shape (FIG. 1), a substantially curvilinear shape (FIG. 2), a substantially hourglass shape (FIG. 3) and a combination of a curvilinear and rectilinear shape (FIG. 4). In addition to the foregoing, it should be understood that additional shapes and combinations may also be suitable for use according to an aspect of the invention. A portion of the ancillary airstream injector sub-system 62 is also illustrated in phantom.

As illustrated in FIGS. 1-4, the dimensions of the chambers diminish or taper inwardly as the ceiling, floor, and side walls extend toward the active openings of the central chamber, regardless of the particular geometric shape selected. Not wishing to be limited hereby, but by example only, the ratio of the height of the exterior opening to the interior opening of the inlet and outlet chambers may range between 1.5:1 and 2.5:1, the ratio being dependent upon the selected design and based on the wind conditions and of the wind power generation plant. It should be understood that individual embodiments of the invention will vary depending upon the locale, with different inlet and outlet chamber shapes and dimensions being determined or selected based upon the historical strength and peculiarity of the wind resource at the particular location.

Figure 5:
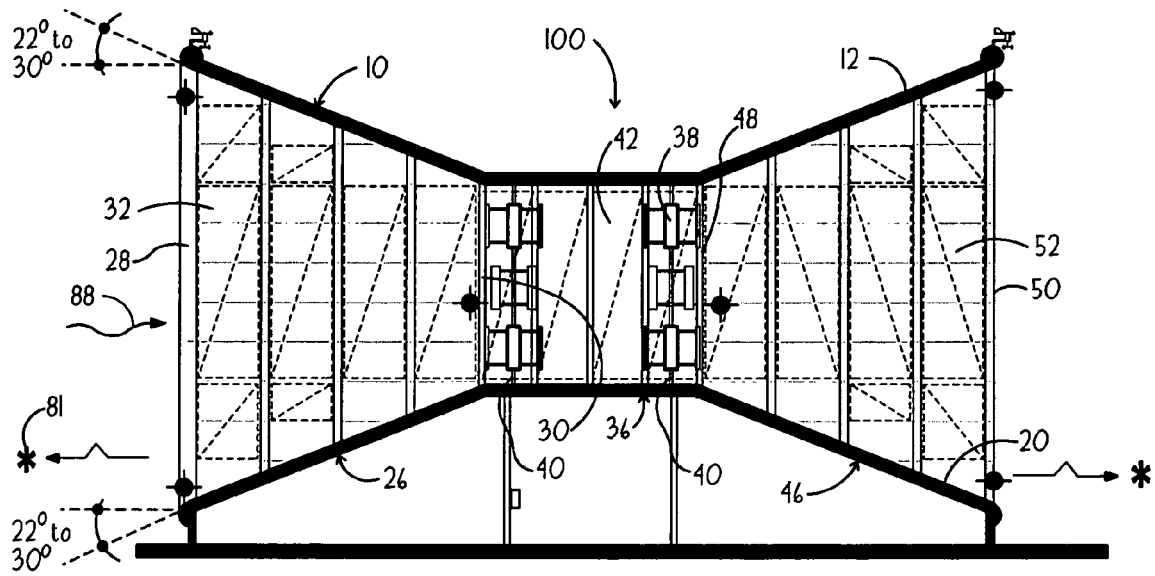
FIG. 5 is cross-sectional view of the system illustrating two rows of vertically configured axes with a plurality of turbines disposed thereon according to an aspect of the invention.
Figure 6:
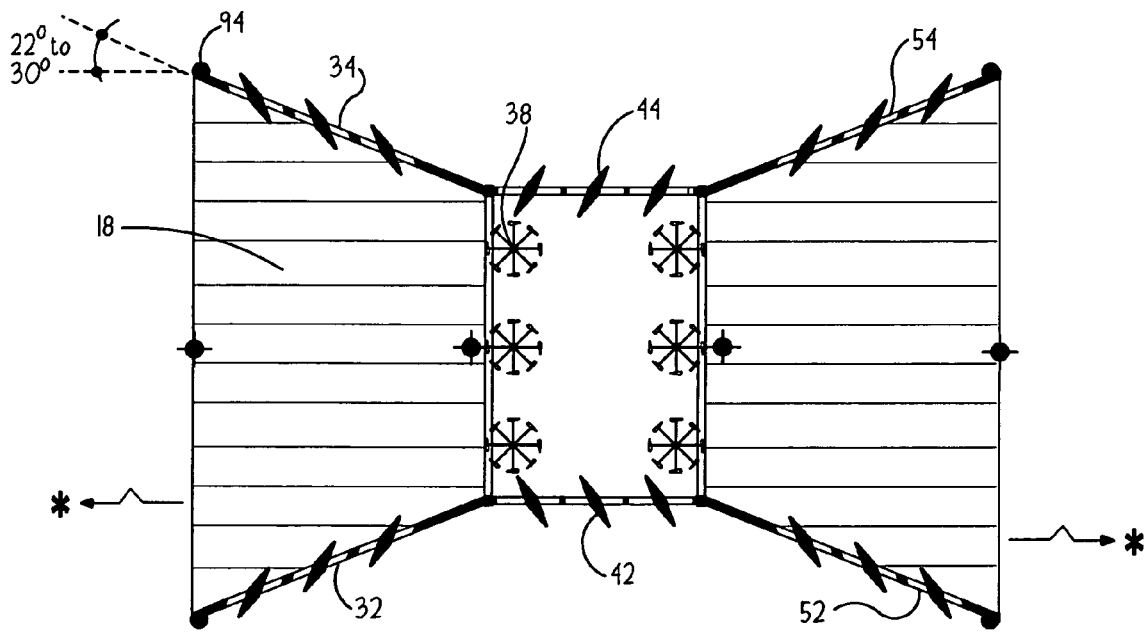
FIG. 6 is a top plan view of the system of FIG. 5, illustrating the two rows of vertically configured axes with a plurality of turbines disposed on each axis according to an aspect of the invention.

Referring to FIG. 5, the housing structure 10 includes a ceiling 12, a floor 20, and oppositely disposed side walls, which, as described herein, include an array of selectively adjustable louver panels, as further illustrated in FIG. 6. Referring to FIGS. 5 and 6, the elongated housing structure 10 forms an airstream inlet chamber 26 with an intake opening 28 for collecting an airstream 88, the airstream inlet chamber 26 including a first and a second array of selectively adjustable louver panels, 32 and 34, respectively. Each array 32 and 34 forms a side wall of the structure 10, the side walls being oppositely disposed. One or more wind speed sensors 80 are disposed within and throughout the housing structure. One or more wind directional sensors 82 are disposed on the outer surface 14 of the housing structure 10 and throughout the housing structure 10. At the top and bottom edges of the front and back ends of the housing structure 10 are rounded protuberances or edges 94.

The airstream inlet chamber 26 includes an internal outlet 30 through which a collected airstream passes. The structure 10 also includes a central chamber 36 for housing a plurality of wind generation power plants, for example, turbines 38, and for receiving a collected airstream from the internal outlet 30 of the airstream inlet chamber 26. A plurality of turbines 38 are rotatably coupled to an axis of rotation 40. The central chamber 36 also includes a third and fourth array of selectively adjustable louver panels, 42 and 44, respectively. Each array 42 and 44 forms a side wall of the structure, and the side walls are oppositely disposed.

The housing structure 10 further includes an airstream outlet chamber 46 with an internal inlet 48 through which a collected airstream passes from the central chamber 36. The airstream outlet chamber 46 includes a fifth and sixth array of selectively adjustable louver panels, 52 and 54, respectively, each of which forms an oppositely disposed side wall of the structure 10. An outlet opening 50 for diffusing a collected airstream is also provided.

The supporting housing structure 10 is composed of steel I-beam columns, attached to concrete foundation pads or piers 11, and steel I-beam and lattice framing members to which ribbed and corrugated 29 gauge and 26 gauge steel panels (or other suitable materials having similar properties, including strength and durability) of varying widths and lengths are affixed to create the walls, roofs, ceilings and floors of the housing structure 10. The construction methodology and materials allow for the structure to withstand wind speeds in excess of 100 miles per hour. Advantageously, the use of this type of steel construction allows for this aspect of the invention to be constructed at a far lower cost per installed kW of power capacity than any existing HAWT or VAWT wind power generation system in current use. The construction methodology advantageously allows for wide spans of up to 300 feet, with a minimal number of columns being in use, a feature not found in the existing wind augmentation and diffusion technologies, as existing augmentation and diffusion applications are either very small in size, or the structures are studded with many columns and extensive framing which cause turbulence in the incoming and outgoing wind stream. As illustrated in FIG. 5, a suitable angle for the inlet and outlet chambers (extending from the central chamber) ranges between 22 and 30 degrees.

According to an aspect of the invention, the housing 10 with the ancillary airstream injector sub-system 62 or 62' disposed thereon is a single continuous structure with at least three distinct and linearly aligned chambers. The housing may have an opening adjacent the central chamber (FIG. 14) or adjacent the outer chambers 26 and 46 (FIG. 16) for receiving (or diffusing) an airstream from the ancillary airstream diverters 62 or 62'. Each chamber is open-ended at both ends and, accordingly, is in fluid communication with an adjoining chamber. Each chamber is constructed with a ceiling, floor, and two active sides, which are openings that allow for the free passage of the airstream into, through and out the chamber. The chambers that include the inlet and outlet chambers each have an opening facing outwards, serving to either capture and funnel the air inwardly toward the wind power plant located in the middle or central chamber, or to exhaust the airstream that has passed through the rotors of the wind power plant, this functionality being dependent upon the direction of the prevailing wind. Advantageously, the chambers are bi-functional, i.e., the inlet chamber can operate as an outlet chamber, and the inlet chamber can operate as an outlet chamber. The second, internal openings of both the inlet and outlet chambers are located in the interior of the structure opening to the central chamber in which the wind power generator is housed, and form a continuum which allows a portion of the airstream to be captured, funneled to the wind power plant, and exhausted.

According to an aspect of the invention, a singular, rigid structure anchored to the ground by means of vertical structural columns attached to concrete foundation pads or piers, does not possess the ability to orient either the inlet chamber, or the equipment of the wind power generation plant lodged in the central chamber, into the direction of the prevailing wind stream. The adjustable airstream focusing sub-system (62 or 62') is thus provided to capture, direct and focus elements of the prevailing wind stream into the opening of the middle chamber.

The ceilings and floors of both the inlet and outlet chambers are faced or lined with ribbed steel paneling 18 (FIG. 6), the ribs of said paneling being aligned perpendicular to the face of the middle chamber, while the side walls of the inlet, central and outlet chambers are comprised of adjustable louvers. The floor and ceiling of the central chamber may also be faced with the same material, or other materials of similar properties, strength and durability, with the ribbing oriented in the same direction as the airstream flowing through the chamber.

Referring to FIG. 6, a top plan view of the structure 10 (without an ancillary airstream injector sub-system disposed thereon) illustrates the side walls of the housing structure 10 that are formed by the selectively adjustable louver panel arrays 32, 34, 42, 44, 52 and 54, respectively, according to an aspect of the invention.

Figure 7:
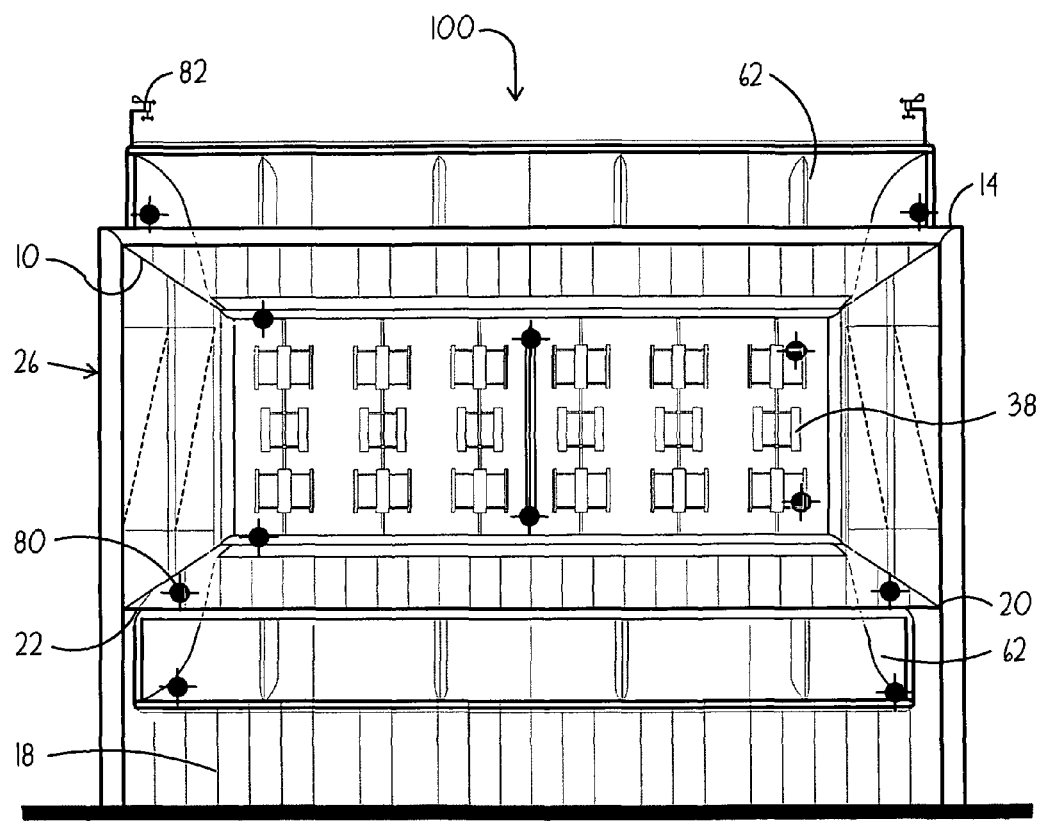
FIG. 7 is a front elevational view of the system illustrating an ancillary airstream injector disposed on the top and bottom surface of a rectilinear structure according to an aspect of the invention.

Referring to FIG. 7, a front elevational view of the system 100 illustrates an ancillary airstream injector subsystem 62 disposed on an outer surface 14 of the ceiling 12 and on an outer surface 22 of the floor 20 adjacent the airstream inlet chamber 26 (another injector 62 is disposed on an outer surface 14 of the ceiling 12 adjacent the airstream outlet chamber 46 and on the outer surface 22 of the floor 20 of the chamber 46) for collecting an accelerated airstream of the structure 10. According to this aspect of the invention, the structure 10 is substantially curvilinear in shape.

Figure 8:
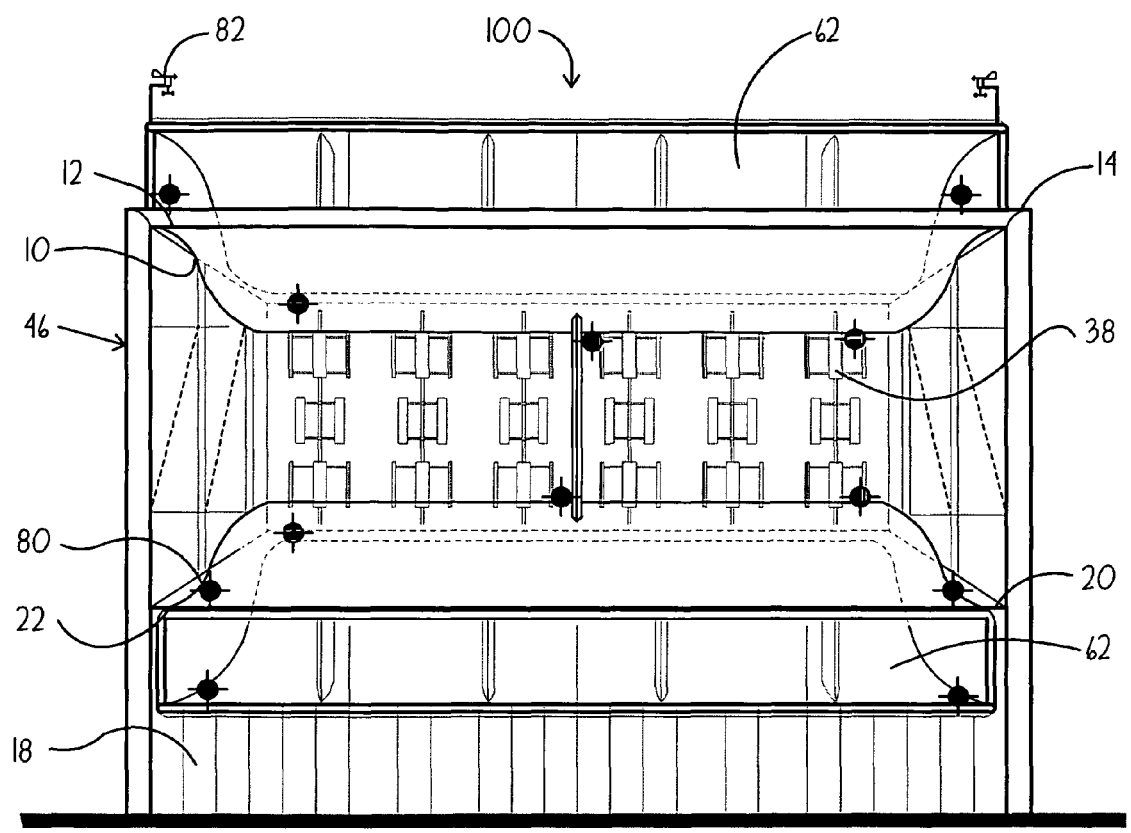
FIG. 8 is a rear elevational view of the system illustrating an ancillary airstream injector disposed on the top and bottom surface of a curvilinear structure according to an aspect of the invention.

Referring to FIG. 8, a rear elevational view of the system 100 includes an ancillary airstream injector 62 disposed on an outer surface 14 of the ceiling 12 and on an outer surface 22 of the floor 20 adjacent the airstream outlet chamber 46 (another injector 62 is disposed on an outer surface 14 of the ceiling 12 adjacent the airstream inlet chamber 26 and on the outer surface 22 of the floor 20 of the chamber 26) for collecting an accelerated airstream of the structure 10. According to this aspect of the invention, the structure 10 is substantially rectilinear in shape. As illustrated by FIGS. 7 and 8, the internal features illustrated in the front view of the structure are essentially the same as the opposite rear view.

FIGS. 7 and 8 exemplify the bi-directional functionality of the system 100. When there is a shift in the prevailing wind, the function of the airstream inlet chamber 26 for receiving and collecting airstreams and the airstream outlet chamber 46 for diffusing collected airstreams is reversed, i.e., the airstream inlet chamber 26 serves to diffuse collected airstreams, and the airstream outlet chamber 46 serves to collect and direct airstreams.

Referring back to FIGS. 1-4, the ancillary airstream injector 62 is illustrated as extending a selected distance beyond the intake opening 28 and the outlet opening 50 of the airstream inlet chamber 26 and the airstream outlet chamber 46 to further direct an airstream into the structure 10.

Figure 16:
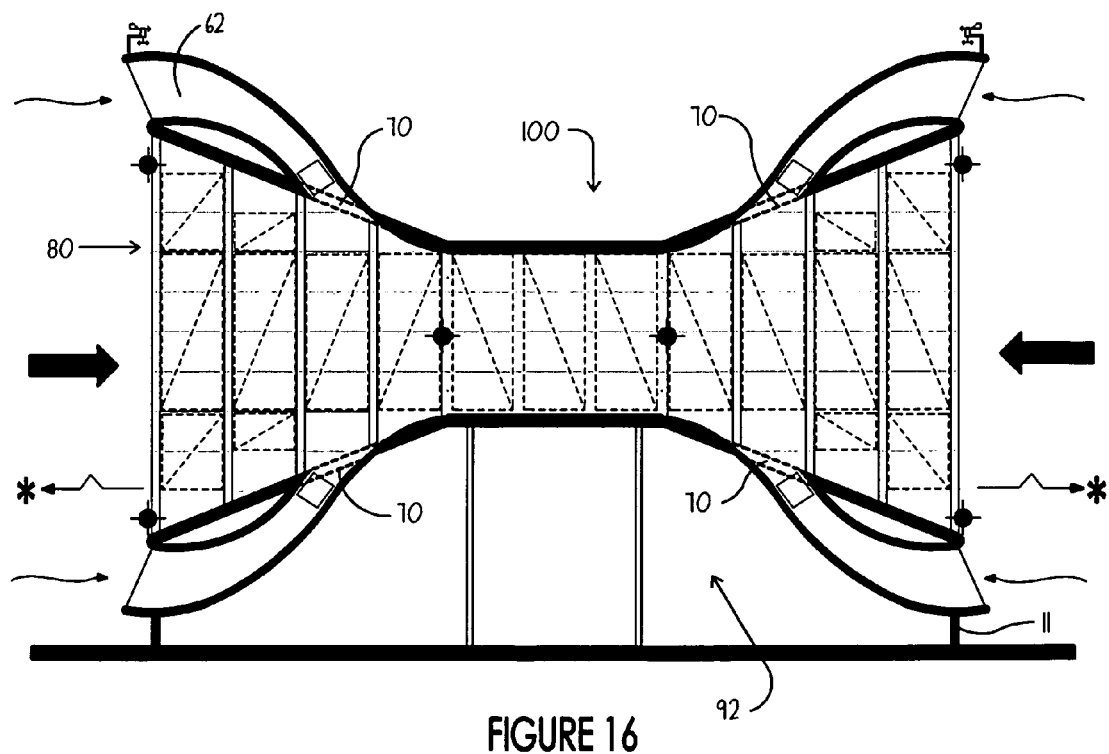
FIG. 16 is a cross-sectional view of the system according to an aspect of the invention.

According to an aspect of the invention, the ancillary airstream injector(s) 62 may extend along substantially the entire length and width of the airstream inlet chamber 26 and the airstream outlet chamber 46, and may also extend beyond the structure 10, as illustrated in at least FIGS. 1-4 and FIG. 14. According to another aspect of the invention, the ancillary airstream injector(s) 62 may only extend over a portion of the airstream inlet chamber 26 and the airstream outlet chamber 46, as illustrated in at least FIG. 18. According to another aspect of the invention, the ancillary airstream injector 62' may form an integral part of the housing structure (FIG. 16). The ancillary airstream injector 62 or 62' serves to collect the upper portion of an airstream that is accelerated by the action of being split upon said top surface 14 of the ceiling 12 of the structure 10 the outer surface 22 of the floor at the openings 28 and 50 of the structure 10. The airstream injectors may be fabricated from sheet metal, aluminum or heavy, fiberglass-reinforced heavy duty plastic or other suitable material.

Figures 9A, 9B:
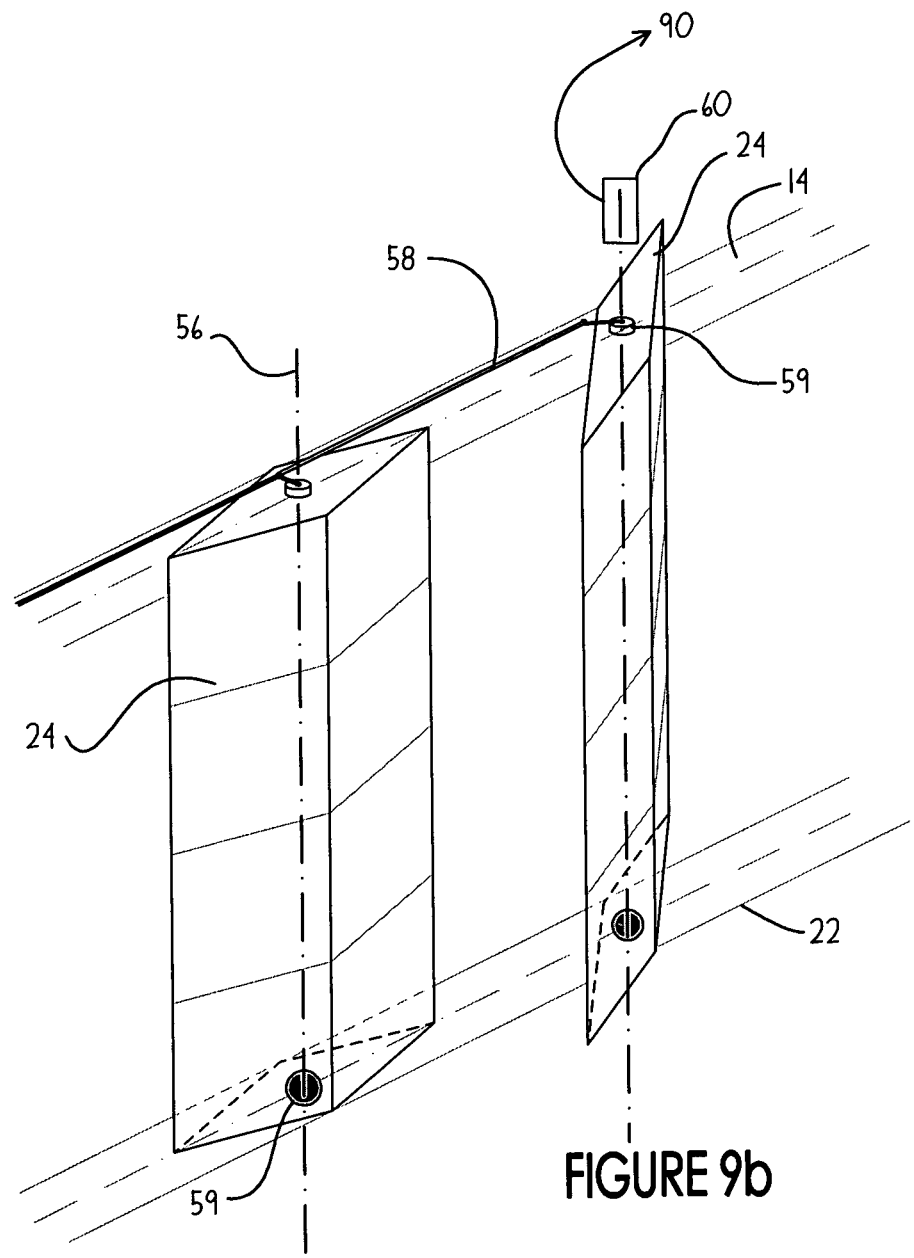
FIGS. 9a and 9b are elevational views of the system illustrating a portion of the selectively adjustable louver panel array of the system, and the movement thereof according to an aspect of the invention.

Referring to FIGS. 9a and 9b, which illustrate elevational views of a portion of the selectively adjustable louver panel array of the system 100, the louver panel 24 on a vertical axis 56 with bearings 59 and rotating socket, is in a closed position in FIG. 9a, and an open position in FIG. 9b. Also illustrated in FIGS. 9a and 9b is a connector arm 58 that may be coupled to a shaft of an electric motor 60 for driving the arrays according to an aspect of the invention. Although illustrated at the top of the louver panel, it should be understood that the connector arm 58 may also be coupled at the bottom of the panel, and alternatively, the panels may be coupled with connector arms 58 at both ends thereof. According to another aspect of the invention, the connector arm 58 is not present, and each of the selectively adjustable louver panels are moved independently of one another, as will be described herein. According to an aspect of the invention, the shaft of the motor 60 may be attached to the axis of the louver panel situated closest to the exterior opening of either chamber, to move the entire panel in concert.

Alternatively, each of the louver panels in the arrays may be independently movable. For example, a variable frequency device (VFD) may be employed, which is an adjustable speed drive, the rotational speed of an alternating current electric motor being controlled by controlling the frequency of the electrical power supplied to the motor. The speed of the motor being controlled by a programmable logic computer (PLC). In this aspect, the motor would have an encoder to provide the position of the motor to the PLC. The PLC will control the speed and position of the motor to achieve a programmed position for the adjustable louver panel arrays. Alternatively, the array of louvers may be adjusted using a chain drive and sprocket arrangement, wherein the axis of one louver is coupled to a drive shaft of a positioning motor, the motor being controlled by a VFD. Each of the louver panels of the array being equipped with a sprocket affixed to a respective rotatable axis, the sprockets being joined by a closed loop drive chain, and the operation of which allows for signal commends from the PLC to the VFD and the positioning motor to be carried out for a particular array by mechanical action of the chain drive and sprocket arrangement.

Figure 10:
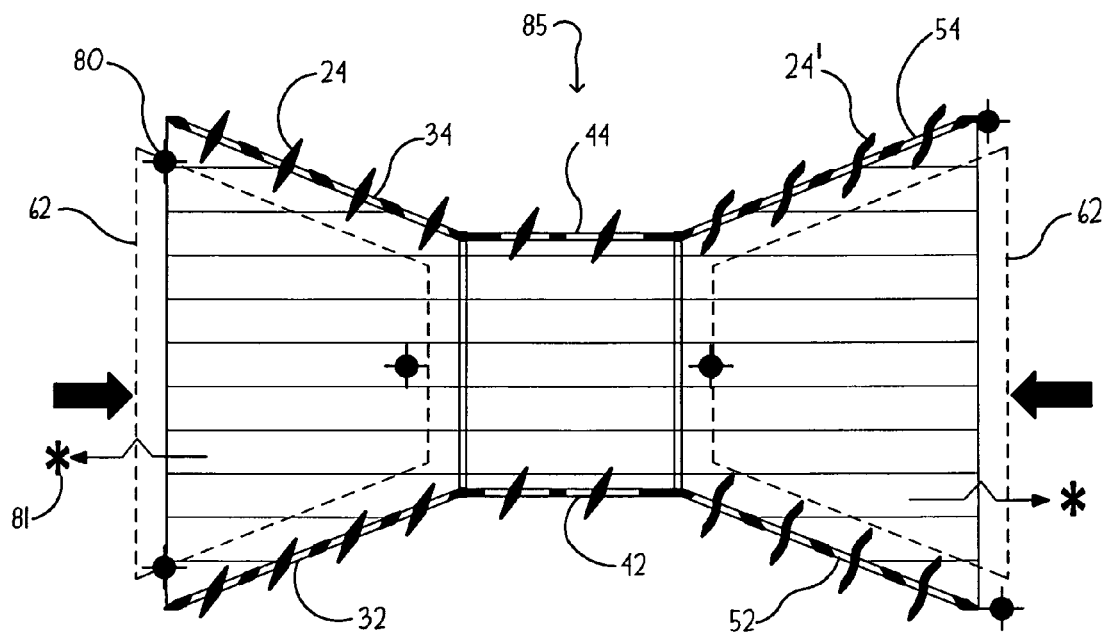
FIG. 10 is a top plan view of the system illustrating the selectively adjustable louver panel arrays of the system, and the different configurations thereof according to an aspect of the invention.

Referring to FIG. 10, the selectively adjustable louver panels 32, 34, 42, 44, 52, and 54 are illustrated. The individual panels 24 may have a diamond or bow-shaped configuration or may have an S-shaped 24' configuration. Other suitable configurations for the panels 24, for example, an air foil configuration, may also be used. FIG. 10 also illustrates the bi-directional functionality of the system 100 and the airstream inlet chamber 26 and airstream outlet chamber 46. The louver panels 24 may be composed of ribbed steel, or other suitable material, the ribs of which are oriented perpendicular to the axis(es) of rotation 40 of the wind power generation plant 38 which facilitates and directs the air stream. The louver panels are designed so as their dimension and shape form a side wall, with the tops and bottoms angled to the pitch of the floor and ceiling of the chamber they are affixed. In a closed position, they form a solid wall. Each directionally adjustable louver is constructed so that the end louver panel extends out beyond the surface plane of an exterior active side of a chamber to allow for additional elements of the passing air stream to be captured and directed towards the impellers of the wind power generation plant 38.

Each louver panel 24 or 24' is coupled to a vertical axis 56 that intersects and extends beyond the top and bottom ends of each panel. According to an aspect of the invention, each end of each vertical axis 56 being seated in a rotating socket, is joined at the top end with a connector arm 58 for moving the louvers in unison. The louver panels may be moved in unison by an electric motor 60, the shaft of the electric motor being attached to the louver panel proximate the opening 28 or 50 of the airstream inlet chamber 26 or the airstream outlet chamber 46. The louver panel proximate the opening 28 or 50 may extend beyond the opening(s) of the chamber(s) 26 or 46. The louver panels have dimensions corresponding to the interior dimensions of the chamber.

Figure 11:
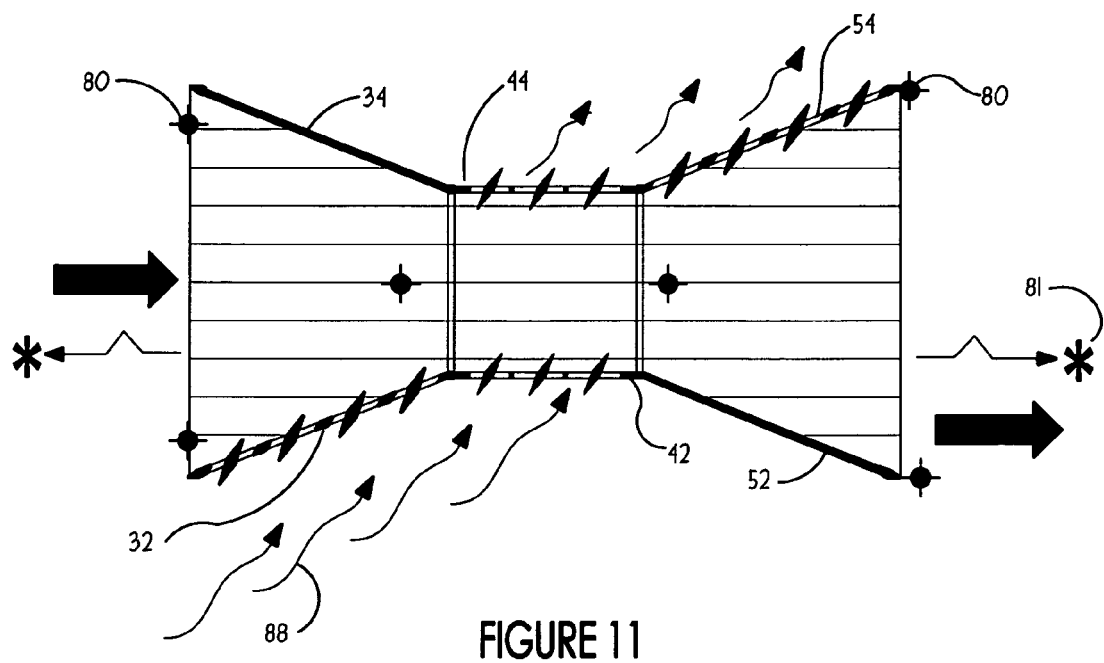
FIG. 11 is a top plan view of the system illustrating the movement of the selectively adjustable louver panel arrays at one angle of attack according to an aspect of the invention.
Figure 12:
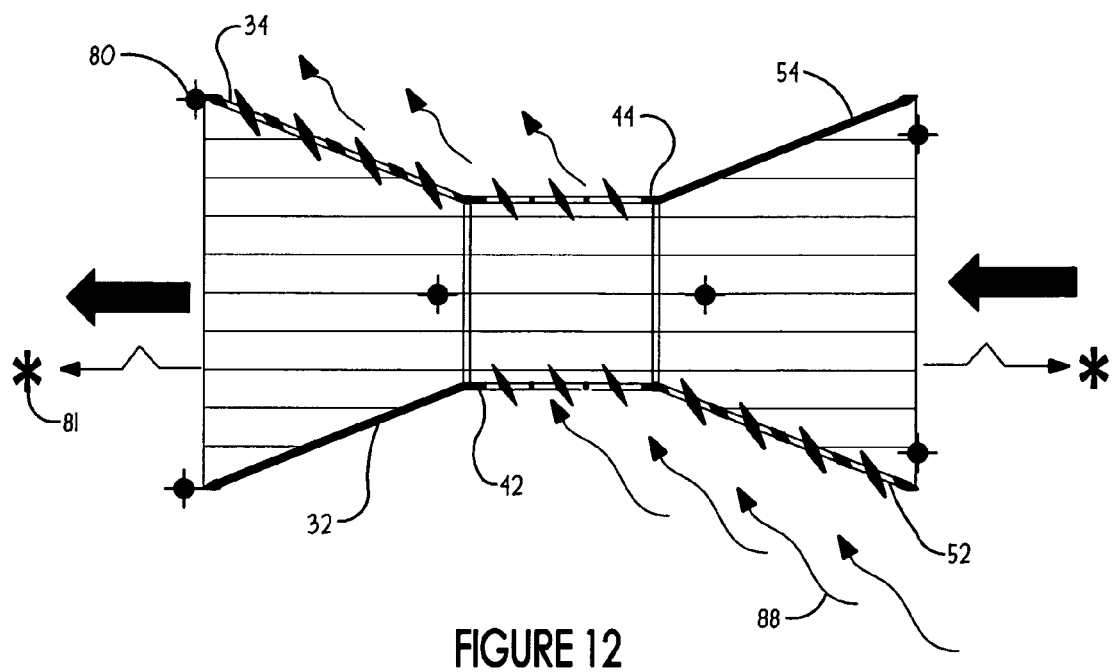
FIG. 12 is a top plan view of the system illustrating the movement of the selectively adjustable louver panel arrays at another angle of attack according to an aspect of the invention.

Referring to FIGS. 11 and 12, the bi-directionality functionality is further illustrated when an airstream 88 is at different angles of attack is illustrated. In FIG. 11, the angle of attack is at about 130 degrees. As illustrated in FIG. 11, the selectively adjustable louver panels 32, 42 and 54 are in an open position, and the selectively adjustable louver panels 34 and 52 are in a closed position. The movement of the louver panels is controlled by a controller system, as described herein. In FIG. 12, the angle of attack is from the opposite direction, at about 130 degrees. As illustrated in FIG. 12, the selectively adjustable louver panels 32 and 54 are in a closed position, and the selectively adjustable louver panels 52, 44 and 34 are in an open position. As illustrated, the louver panels further direct an airstream either into or out of the central chamber. The opening and closing movement of the louver panels is determined by a controller which actuates depending upon the direction of the prevailing wind.

It should be understood that a prevailing wind with an angle of attack that is exactly perpendicular, i.e., 90°, to the orientation of the rotation of the axis or axes of the wind power generation plant 38 is the most productive for propelling the impellers. Each degree of shift, from an angle of attack of 90°, results in a progressive lessening of the effective wind power available for striking the impellers of the power plant. For example, at a 140° angle of attack or greater (or 40 degrees if the measurement of degrees is taken from the receding side of the scale), the wind stream is significantly less effective, because of its oblique approach to the wind power generation plant's turbines, for the purpose of powering the wind power generation plant if devices and mechanisms to direct elements of the airstream at a productive angle into central chamber are not utilized.

The louver panels are capable of being continually re-positioned in reaction to shifts in the angle of attack of the wind stream, thereby capturing elements of the wind stream and directing said wind stream elements into a more productive angle of attack upon the impellers of the wind power generation plant 38. Wind directional sensors 82 may be disposed around the exterior perimeter of the housing structure and remote sensors 81 disposed as far as one mile from the structure may be included to monitor the direction of the prevailing wind speed and send a signal to the main controller, which will then issue a signal command to the appropriate variable frequency drive or drives to the positioning motor associated with the selectively adjustable louver panels, instructing the motor to turn the axis of the master louver panel to adjust the positioning of the entire array of louver panels to an orientation that most productively captures elements of the passing air stream. Advantageously, the continuous re-adjustment allows for prevailing wind streams with up to a 170° angle of attack to be captured and directed at a more productive angle towards the impellers of the wind power generation plant 38.

Figure 13A:
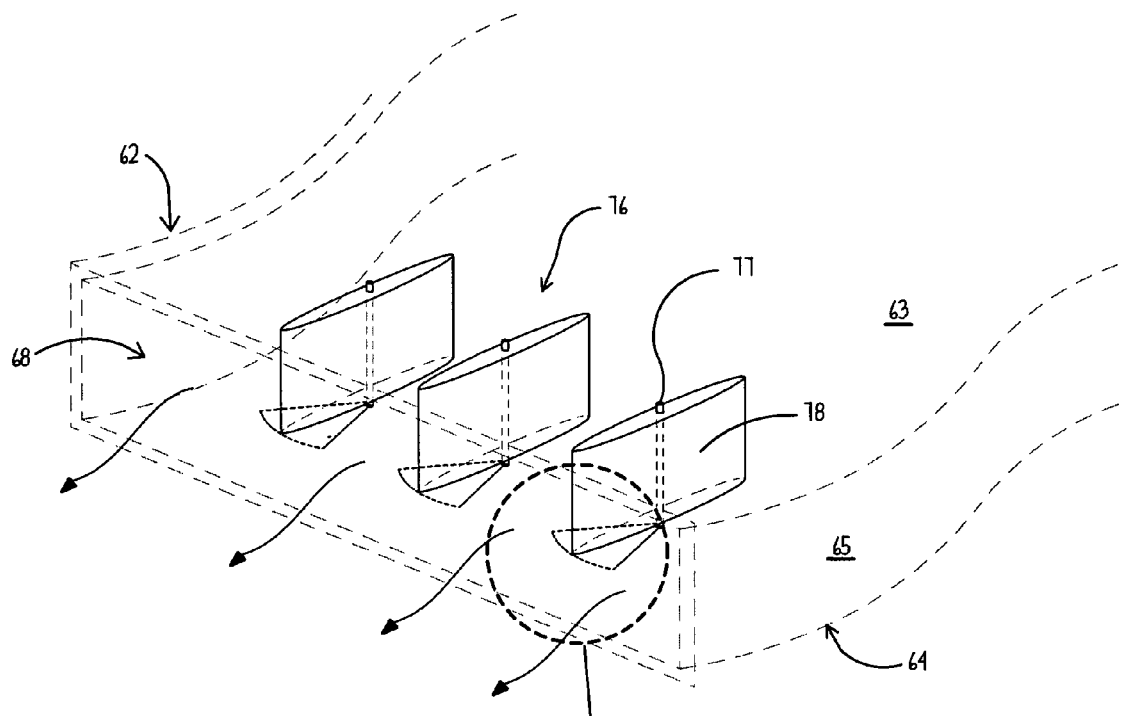
FIG. 13a is an isometric and phantom view of the ancillary airstream injector illustrating the interior airstream diverter panels according to an aspect of the invention.
Figure 13B:
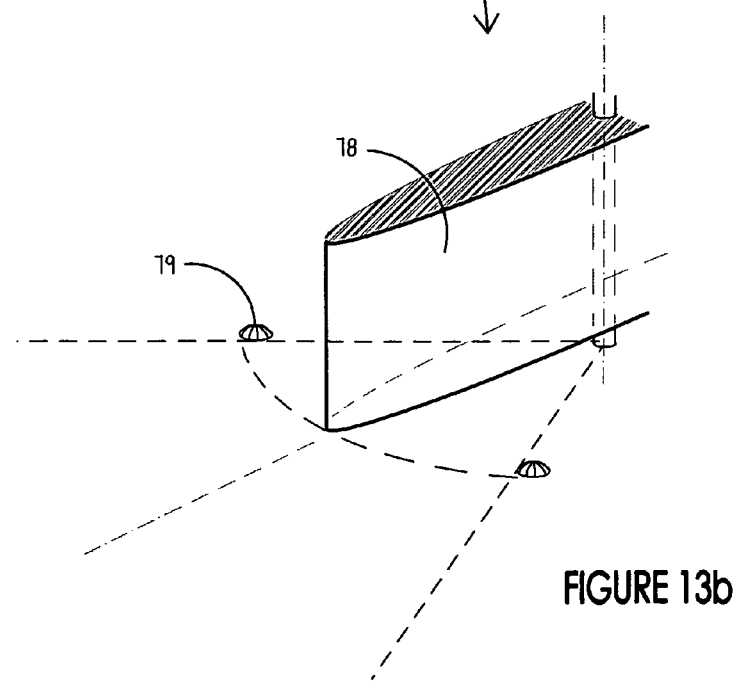
FIG. 13b is a cross-sectional view of a portion of FIG. 13b, illustrating the movement of the interior airstream diverter panels according to an aspect of the invention.

Referring to FIGS. 13a and 13b, the ancillary airstream injector sub-system 62 or 62' is shown in phantom to illustrate the interior airflow diverter 76. As illustrated in phantom, the ancillary airstream injector 62 is in the form of an open-ended, hood-like structure, with a top surface 63, a bottom surface 64, and two oppositely disposed side walls 65. As illustrated in FIG. 13a, situated at the second open end 68 of the ancillary airstream injector 62 is an interior airstream diverter 76 which includes a plurality of interior airstream diverter panels 78, each coupled to an axis of rotation 77, and arrayed across the top surface 63 of the ancillary airstream injector 62. The diverter panels 78 are freely-movable, and have a maximum 30 degree rotation. The movement of the diverter panels 78 is maintained at the 30 degree rotation by spherical stops 79, as illustrated in FIG. 13b.

The hood-like structure of the ancillary airstream injector sub-system 62 or 62' also serves, when the prevailing airstream is striking the hood-like structure from its backside, to operate in a flange-like fashion on both the outlet and inlet chambers, causing the air stream passing around the exterior walls, ceiling and floor of the chamber to swirl into the area where the air stream that has traveled through the outlet chamber is exhausting. Advantageously, the downward swirling of the exterior wind stream aids in the creation of vortexes that increase the velocity of the exhausting air stream from the inlet chamber.

The diverter panels 78 may be composed of thin steel, heavy duty plastic or other suitable material, and may be shaped to the size and dimensions of a selected cross-sectional segment of the interior surface of the ancillary airstream injectors 62 and 62'. The freely-movable diverter panels 78 are each coupled to a rotatable axis 77, each end of which is fixed in swivel sockets set in the top and bottom of the interior surface of the interior airflow diverter 76, extending in a perpendicular direction therefrom as illustrated to allow the internal airstream diverter panels 78 to swing freely on the rotatable axis(es), with the side-to-side movement going beyond the scope for productive use of a windstream being limited by the stops 79. The size, placement and distance between the interior airflow diverters 76 disposed within the interior of the ancillary airstream injectors 62 and 62' may be varied, depending upon the particular features of the wind resource at an installation site for the system 100.

Figure 14:
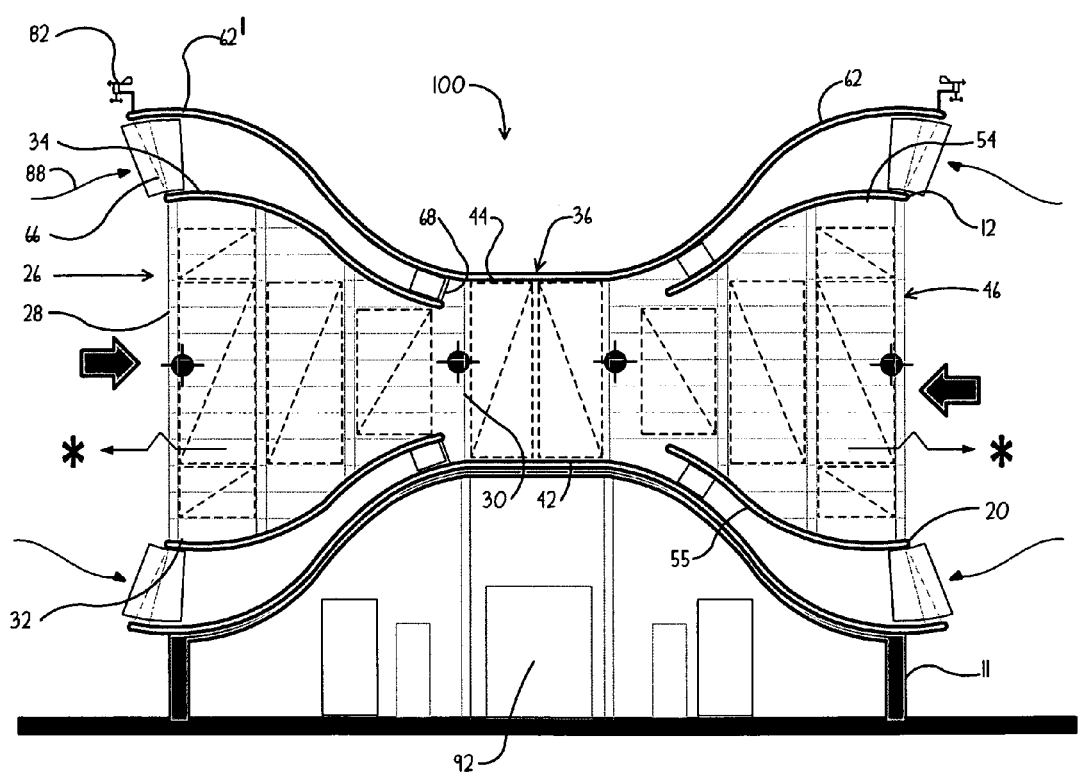
FIG. 14 is a cross-sectional view of the system forming part of a housing and illustrating additional energy-producing technologies incorporated with the system according to an aspect of the invention.

Referring to FIG. 14, a first open end 66 of an ancillary airstream injector 62' is disposed adjacent the intake opening 28 of the airstream inlet chamber 26 and a second open end 68 is disposed adjacent the internal outlet 30 of the airstream inlet chamber 26 at the interface with the central chamber 36. The ancillary airstream injector 62' is suitably coupled to the housing structure 10 by bolts, welding, or other conventional means for coupling. The ancillary airstream injector 62' tapers inwardly from the first open end 66 to the opposite second open end 68. According to an aspect of the invention, the shape of the ancillary airstream injector 62 essentially corresponds to the selected shape of the corresponding housing structure, and is continuous. FIG. 14 also illustrates a housing or storage facility that may be formed under the installed system, which may be used for animal husbandry, storage, work, or other uses.

For example, various sized openings, including doors and windows may be placed underneath the structure 10. In addition, additional and various energy producing technologies can be incorporated within or added to the system. These technologies may include, but are not limited to, geothermal, hydro power, steam, natural gas cogeneration, photovoltaic and thermal solar systems. If so employed, it should be understood that the photovoltaic and thermal solar system panels would be placed on the top surface of the ancillary airstream injector sub-system 62 and 62'.

The interior airflow diverter 76 of the ancillary airstream injector sub-system 61' serves to increase the velocity of an airstream as it passes through the first open end 66 to the second open end 68 into the central chamber 36. The interior airstream diverter 76 is disposed at a selected angle to introduce an additional airstream into the interior of the central chamber 36 towards the impellers or blades of the turbines 38 of the wind generation power plant that are housed in the central chamber 36. One or more interior airstream diverters 76 may be disposed along the length and in the interior portion of the ancillary airstream injector 62'. According to this aspect of the invention, the housing structure 10 is non-continuous, as there is an opening adjacent the central chamber 36, but a continuum is formed with the addition of the continuous structure of the ancillary airstream injector sub-system 62'.

Figure 15:
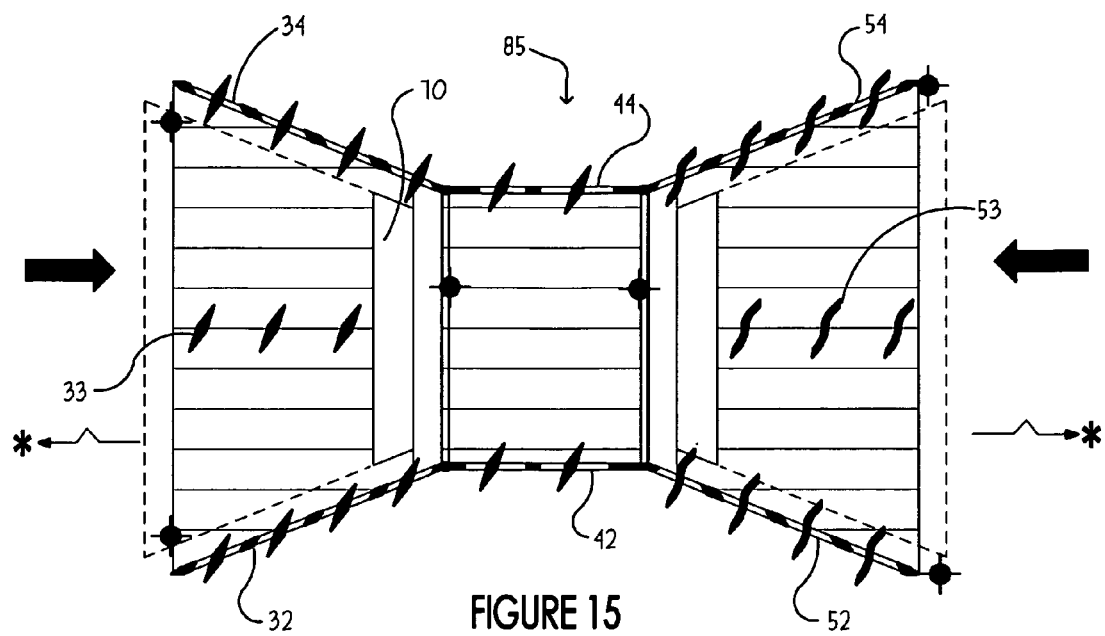
FIG. 15 is a top plan view of the system illustrating ancillary airstream injectors disposed on the top surface of the rectilinear structure according to an aspect of the invention.

Referring to FIG. 15, two additional selectively adjustable louver panel arrays 33 and 53 are illustrated in the housing structure. According to this aspect of the invention, the ancillary airstream injector subsystem 62 includes a slotted opening 70.

Referring to FIG. 16, the ancillary airstream injector sub-system 62 forms an integral part of the housing structure 10. According to this aspect of the invention, the sub-system 62 has a slotted opening 70. The apparatus 85 of the system 100 is illustrated as being disposed on concrete piers 11 and has an available storage area 92 located underneath.

Figure 17:
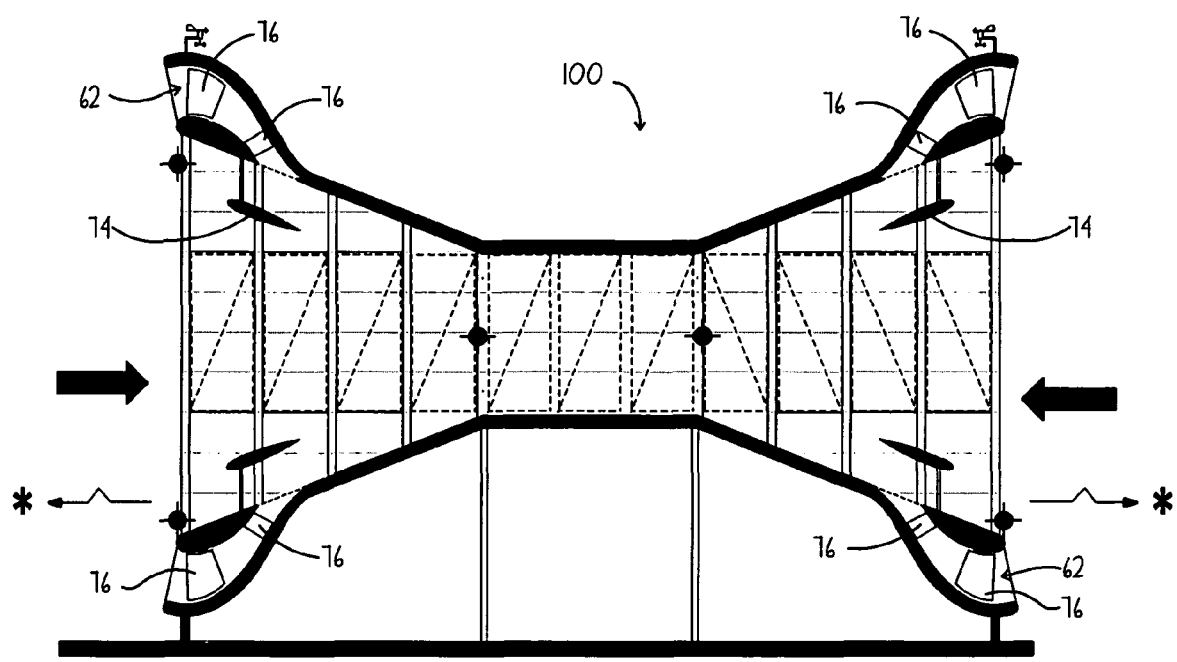
FIG. 17 is a cross-sectional view of the system illustrating additional features according to an aspect of the invention.

Referring to FIG. 17, according to this aspect of the invention, one or more airfoil deflectors 74 are coupled to the outer surface of the ceiling, and to the outer surface of the floor with adjustable pipe-like support structures 73. In this aspect, the airfoil deflectors 74 are in a fixed position, and are parallel to the plane of the floor and ceiling.

Figure 18:
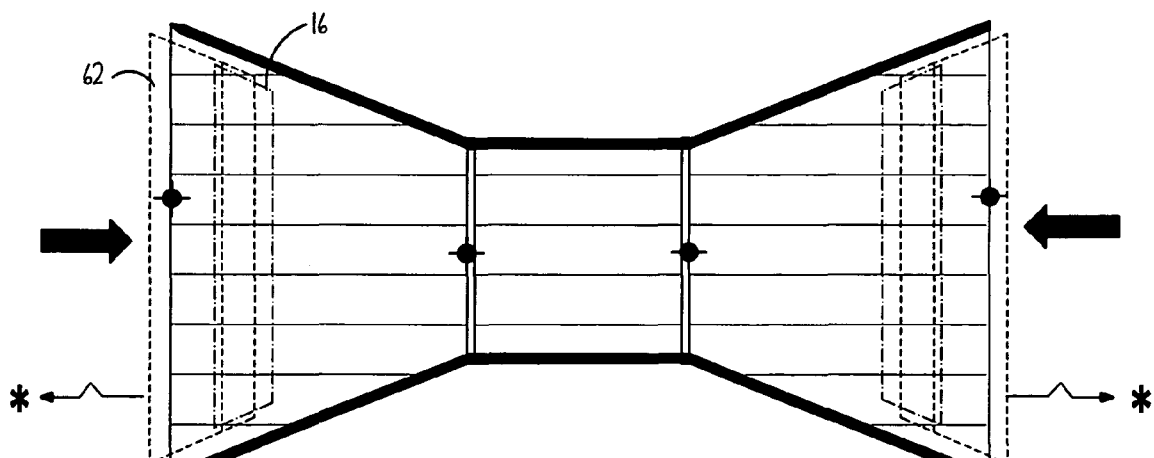
FIG. 18 is a top plan view of the system illustrating an alternative embodiment of the ancillary airstream injector sub-system.

Referring to FIG. 18, the ancillary airstream injector sub-system 62 including a slotted opening 70 is disposed on a portion of the ceiling or floor of the housing structure 10.

Figure 19:
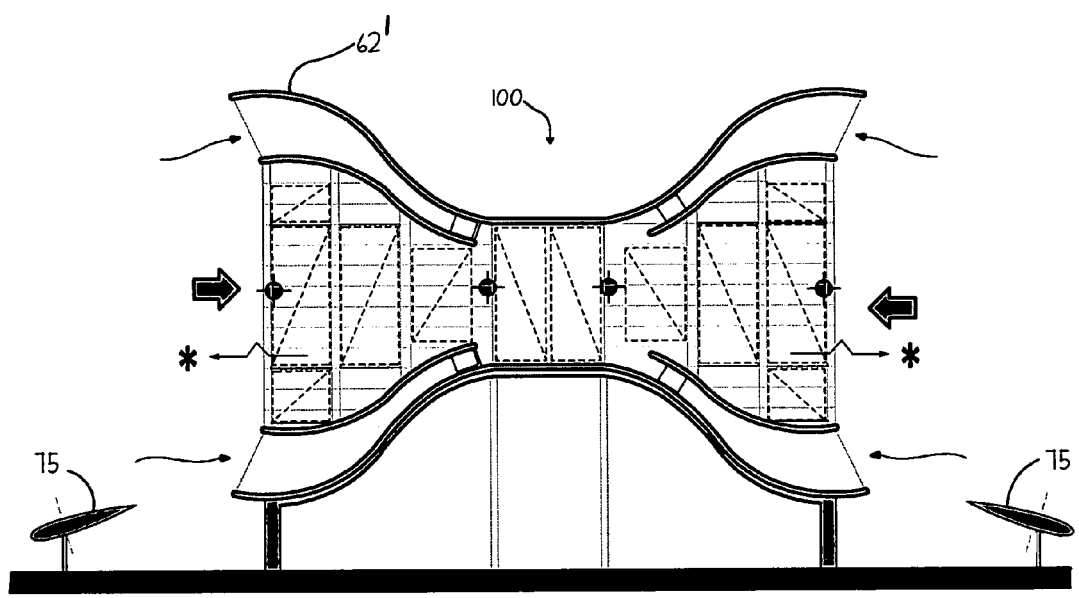
FIG. 19 is a cross-sectional view of the system illustrating additional features according to an aspect of the invention.

Referring to FIG. 19, the system of FIG. 14 is illustrated with adjustable airfoil deflectors 75, which serve to further direct ambient wind currents to the structure.

Figure 20:
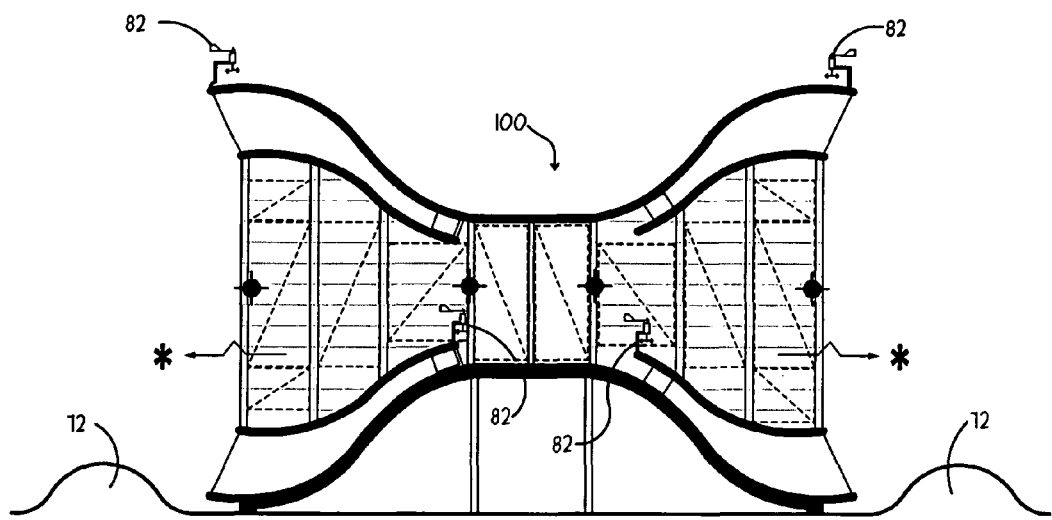
FIG. 20 is a cross-sectional view of the system illustrating additional features according to an aspect of the invention.
Figure 21:
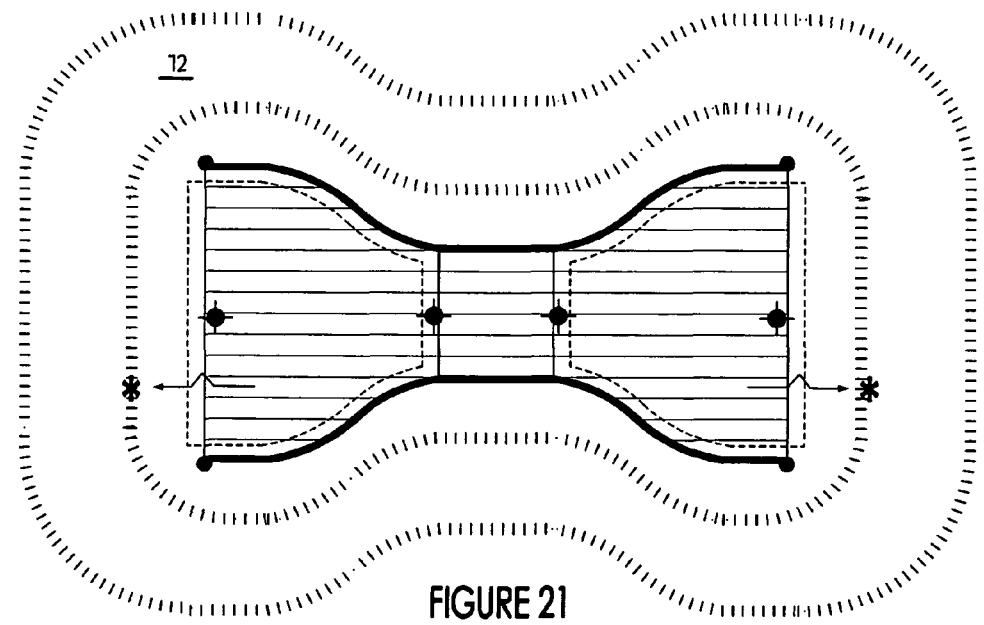
FIG. 21 is a top plan view of the system illustrating a berm in the area surrounding the structure.

Referring to FIG. 20, which illustrates a system similar to that of FIG. 14, with additional features including wind directional sensors 82 disposed in the interior of the structure, and one or more berms 72. The berms 72 serve to direct a portion of the airstream passing close to the ground to the structure of the system, which may enter either the inlet chamber or the outlet chamber. A berm 72 in the area surrounding the structure is illustrated in FIG. 21. The berms 72 may be formed of dirt or other suitable and readily available materials.

Figure 22:
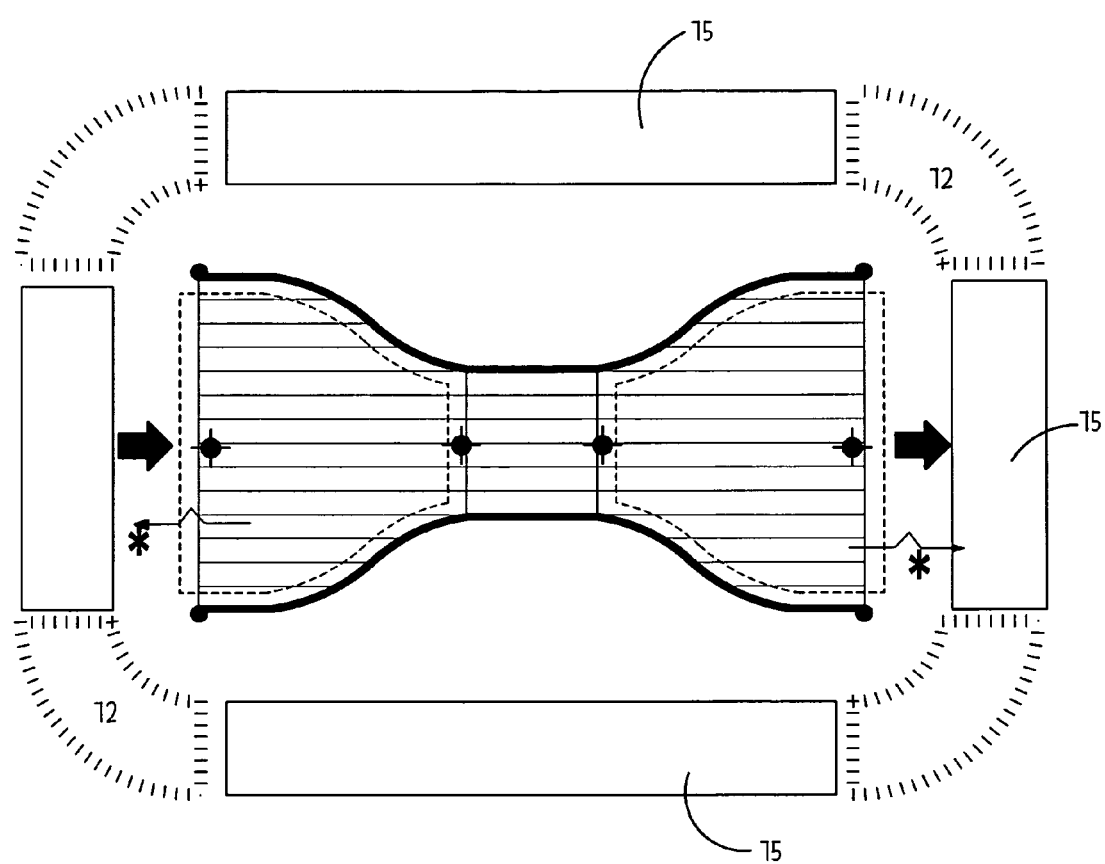
FIG. 22 is a top plan view of the system illustrating additional features according to an aspect of the invention.

Referring to FIG. 22, according to another aspect of the invention, adjustable airfoil deflectors 75 and berms 72 are disposed about the periphery of the structure. Both the adjustable airfoil deflectors and berms serve to direct airstreams flowing close to ground level to the structure of the system.

It has been found that many potential installation sites in regions where the contours of the terrain naturally augment and focus the wind can have the resource further enhanced through the construction of berms in close proximity of the airstream intake devices and structures of a wind power generation facility that is situated close to the ground.

According to an aspect of the invention, a main controller is connected to the axis(es) 40 of the power plant 38 and the individual louver panels, or an array of adjustable louver panels, for selectively controlling movement of the adjustable louvers and for utilizing RPM (revolutions per minute) output signals from the axis(es) of the power plant in order to more efficiently control the movement of the adjustable louvers in order to increase the rotational energy output into mechanical or electrical energy is also provided. For example, if the controller issues commands to move the position of an array of louvers based on input signals received from wind direction sensors placed in and around the Housing structure, and the power plant's RPM (revolutions per minute) sensors send an output signal indicating that the movement of the array of louvers increased the RPMs of the power plant's axis(es), thereby increasing electricity production, the controller would issue a series of commands to the louver arrays to continue making incremental adjustments in positioning in order to further increase electricity production. Output signals from the power plant's RPM sensors to the controller indicating increasing RPMs would result in the controller issuing a command to continue the incremental movement of the louver array in the current direction. If output signals from the power plant's RPM sensors indicated a reduction in the RPMs of the power plant's axis(es) the controller would issue a command to 'correct the positioning' of the louver array to the last former position where the higher level of RPMs was being realized. This ability to make incremental adjustments to the position of the louver arrays extends the production range, and increases the power-producing capability, thereby increasing the capacity factor of the system. The ability to capture wind from a wider scope and operate in a bi-directional fashion with a reversal of the prevailing wind, also increases the power producing capability, thereby further increasing the capacity factor of the system. The ability to collect the accelerated airstream created by the splitting of the airstream upon the top, bottom and side edges of the open ends and side walls of the inlet and outlet chambers with the ancillary airstream injector sub-system 62 or 62' and direct the airstream towards the central chamber also increases the power producing capability, thereby further increasing the capacity factor of the system. In addition, the versatility and adaptability of the system provides for effective use of the method and system in any specific mountainous site, or the individual wind resource characteristics of a site. The controller for use according to an aspect of the invention is described in co-pending application Ser. No. 12/927,709, filed on even date herein, titled: CONTROL SYSTEM AND METHOD FOR CONTROLLING WIND POWER GENERATION PLANT, the entire disclosure of which is hereby incorporated herein by reference.

Advantageously, the system, apparatus, and method of the invention harnesses the combined effects of initially augmenting, then diffusing an airstream by collecting, directing and concentrating the approaching wind and subsequently diffusing the exiting wind stream through the use of a single structural continuum, for the purpose of increasing the amount of wind energy being directed at rotors/blades/impact impellers rotatably attached to turbines or other suitable mechanisms for a wind power generation plant housed within the structure. By diffusing the airstream through either chamber 26 or 46, an area of lower air pressure is created which further increases the velocity of the airstream passing through the area housing a wind turbine array or other suitable mechanism through the creation of a vortex effect.

Figure 23:
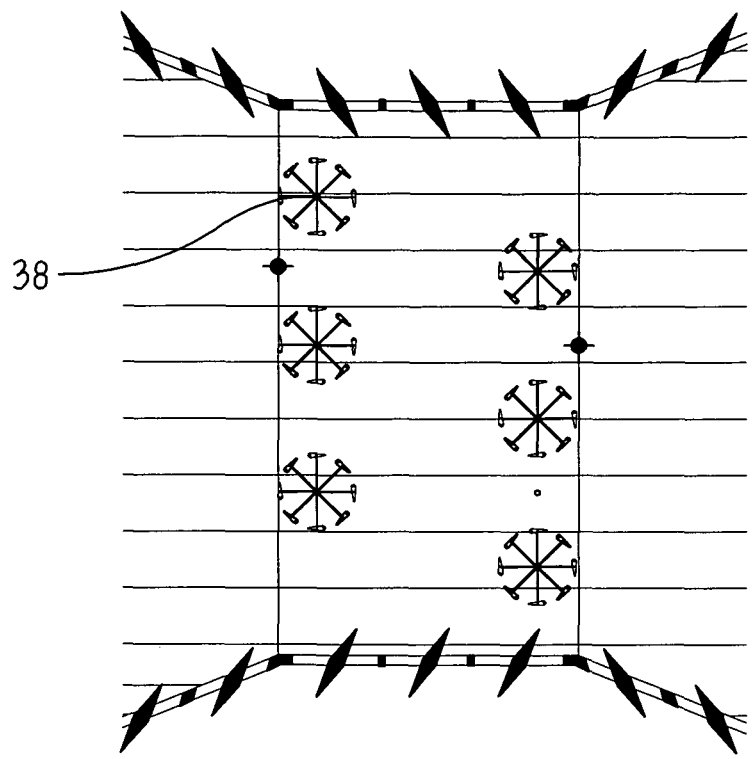
FIG. 23 is a top plan view of a wind power generation plant according to an aspect of the invention.
Figure 24:
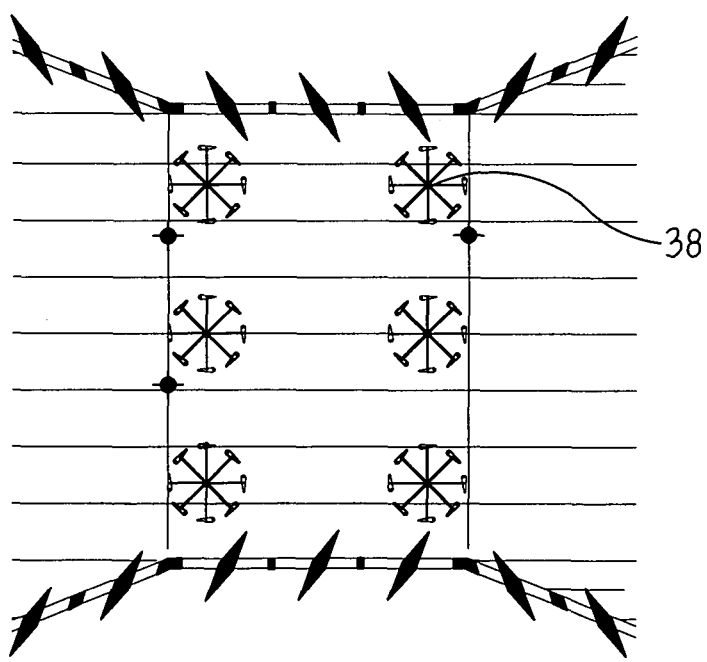
FIG. 24 is a top plan view of a wind power generation plant according to an aspect of the invention.
Figure 25:
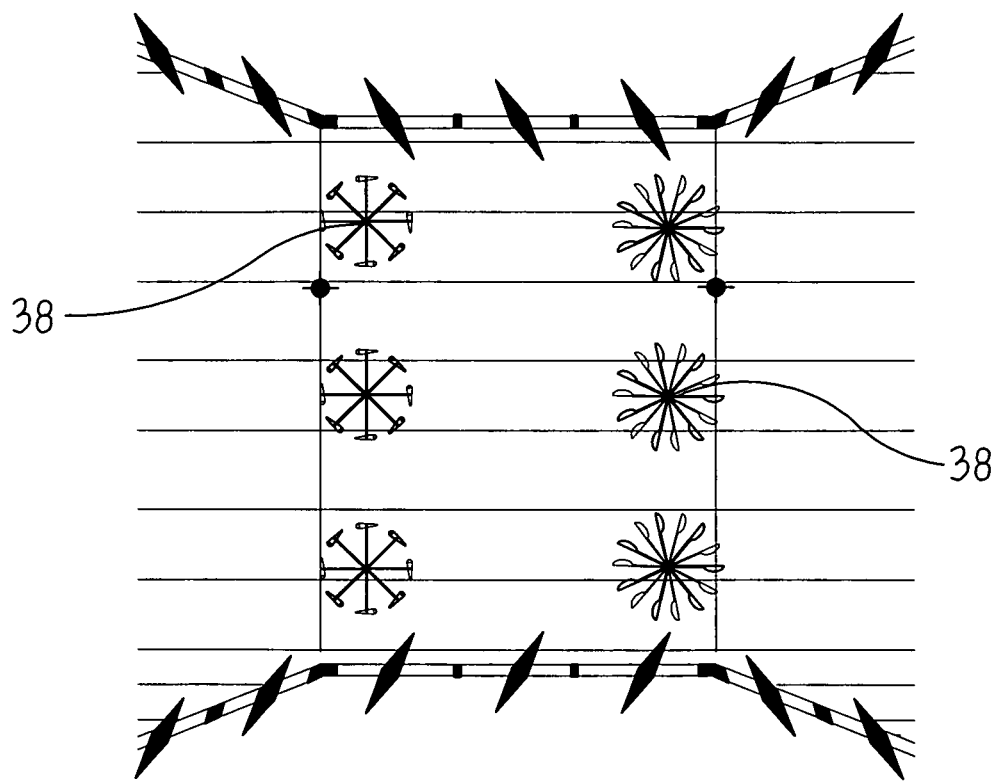
FIG. 25 is a top plan view of a wind power generation plant according to an aspect of the invention.

The particular embodiment of the structure and system may depend upon the actual nameplate power capacity of the wind power generation plant. For example, at sites where the system is installed that have larger nameplate power capacity ratings, one or more rows of axes may be installed in the central chamber, with multiple turbines with impellers rotatably affixed on each axis, the sizing and power rating of the individual turbines being determined by the nameplate power capacity. When this configuration is appropriate, the axes will be arranged in two rows set in a tandem fashion, 'front and back,' with the required 'airstream recovery' distance between them being determined by variables such as turbine/impeller type, design, sizing, power rating and additional factors related to any particular installation site's wind resource, as illustrated in FIG. 23. Alternatively, the turbines may be staggered in a particular arrangement, as illustrated in FIG. 24. The blades of the turbines may have a variety of shapes, as illustrated in FIG. 25, with H-blades on the left and C blades on the right of the drawing. The wind power generation plant may comprise turbines disposed either singly or in multiple numbers on vertical or horizontal axes, and may include centrifugal permanent magnetic generators (PMG), including turbines.

Additionally, the dimensions of the central chamber, which houses the wind power generation plant, may be scaled to reflect the sizing of the wind power generation plant, for example, the distances between rows of axes, sizing of turbines, and the orientation of the rotational axes of the power plant. The sizing is also based upon the power capacity of the wind power generation plant, and the orientation of said axis or axes based upon the peculiarity of the wind resource at a particular location where an embodiment according to an aspect of the invention is situated. The dimensional ratios between the height, width and length of the central chamber are also a factor of the individual features of any particular installation site's topography and wind resource.

As discussed above, the width, height and length of each individual embodiment of the invention are primarily based upon the sizing of the actual nameplate power capacity of the wind power generation plant. For example, in one aspect, the invention can range in size from a width of 80 feet, a length of 80 feet, and a height of 40 feet for installations with nameplate power capacity in the region of 100 kW, to installations 100 feet wide, 300 feet in length and 75 feet in height for installations with power capacity in the region of 500 kW or higher. According to this aspect of the invention, additional louver panels may be present in the interior of the inlet chamber (as illustrated in FIG. 15) and the walls of the central chamber may be comprised of adjustable louver panels. This aspect of the invention also shows the presence of ancillary airstream injection sub systems along the top edges of the open sides of the inlet and outlet chambers.

The operation of the system will now be described. The wind power generation plant (WPGP) generates wind power through a single wind turbine, or a plurality of turbines 38 rotatably disposed on a rotational axis 40. The axis 40 is joined to a drive shaft of a permanent magnetic generator (PMG). The wind power generation plant converts energy extracted from the air stream 88 by the impellers of the wind turbines 38 into rotational mechanical power, and then converts this energy into electricity utilizing the electromagnetic process created by the turning of the core of the PMG which is affixed to the drive shaft of the generator against stationary portions of the generator that surround the core.

Referring to FIGS. 26a-28b cross-sectional views of a wind power generation plant with one or more H-type turbines according to an aspect of the invention are illustrated. FIGS. 29a-31b are cross-sectional views of a wind power generation plant with one or more C-type turbines according to an aspect of the invention. In FIGS. 26a and 29a, an rpm sensor 95 is coupled to the axis of rotation 40, to which an optional gear box 96 may be coupled thereto. A permanent magnetic generator (PMG) 97 coupled about the axis 40 includes a secondary controller 98 and inverter 99 for converting DC current to AC is also illustrated. The rpm sensor 95 is configured to send signals to the main controller 90, and if conditions warrant, the secondary controller 98 sends instructions to the braking device 93 to halt rotation of the turbine 38. FIGS. 27a, 28a, 30a and 31a illustrate the ganging of turbines 38 on the axis of rotation 40, and FIGS. 26b, 27b, 28b, 29b, 30b, and 31b illustrate the increased number of blades or rotors when more than one turbine 38 is on an axis 40.

Figure 32:
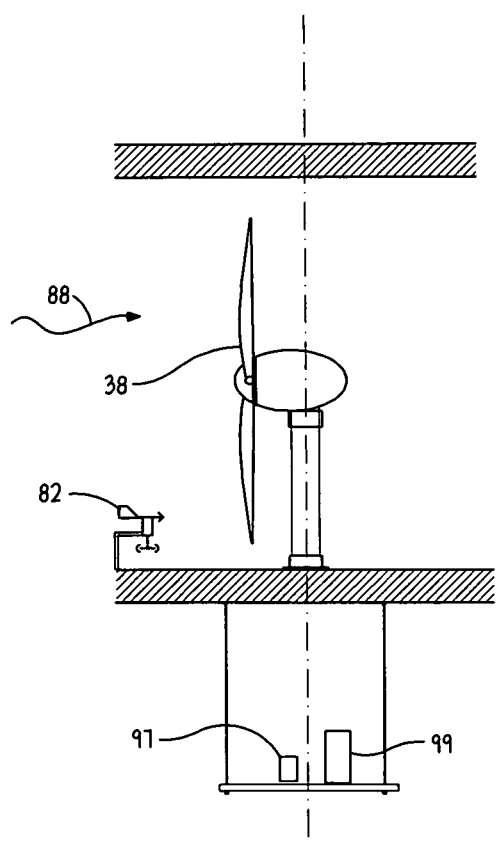
FIGS. 32 and 33 are cross-sectional views of a horizontal wind power generation plant according to an aspect of the invention.
Figure 33:
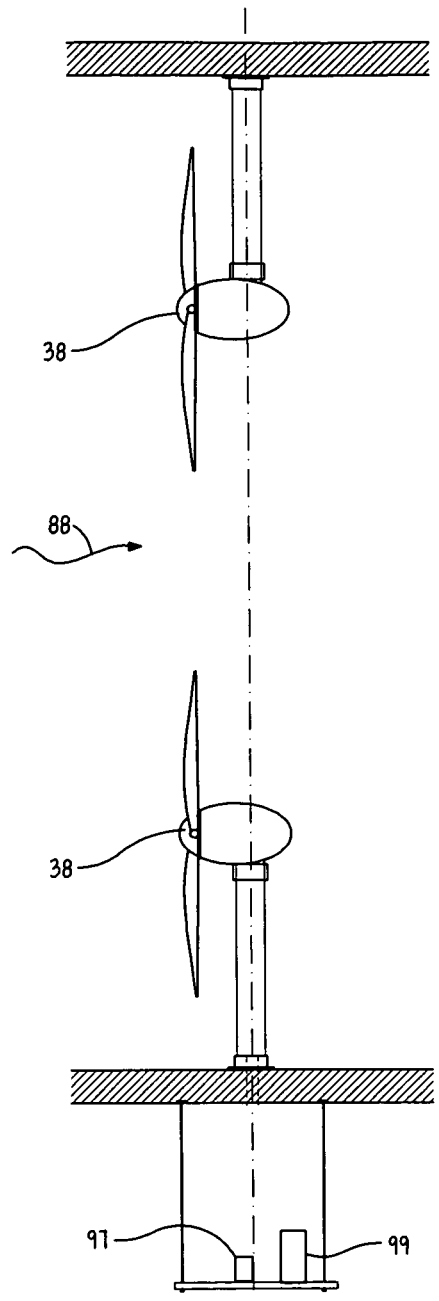

FIGS. 32 and 33 are cross-sectional views of a horizontal wind power generation plant according to an aspect of the invention.

The wind turbines 38 include a plurality of impellers (blades, rotors) which are coupled to a structural frame to position and orient the impellers to effectively present a certain area of their surface to the passing wind stream in order for the wind stream to strike against the impellers and cause the axis to rotate.

Each individual wind power generator (WPG) of the WPGP is equipped with its own real-time programmable controller capable of receiving one or more signals and issuing commands for adjusting selected parameters based on the received one or more signals. The main functions of the controller being the regulation of the speed of the rotation of the rotational axis and the performance of a 'dump load,' an operational sequence for the dissipation of 'over-produced' electricity, to rectify frequency-variable output voltage of the WPG to DC voltage before feeding the produced electricity into the inverter for conversion into AC voltage, thereby affording overvoltage protection for the WPG and the inverter.

The controller receives real time input signals from wind speed sensors 80, from voltage monitoring components that are part of that individual WPG's electrical system, from sensors monitoring the RPMs of the WPG's rotational axis, and from an electromagnetic braking device that is a component of the WPG.

The electromagnetic braking device, equipped with an encoder and sensor, is in communication with the controller, with the sensor being capable of providing an output to the controller. The electromagnetic braking device is also attached to the rotational axis 40 of the WPG and is utilized to prevent the axis from over speeding, which can result in reduced production, or, in extremely high winds which could result in the WPG's turbines and other components being damaged or destroyed.

When the increasing velocity of the wind stream striking the impellers of a WPG's turbine or turbines causes the revolutions (rotations) per minute (RPMs) of the wind power generator's (WPG's) turbines and rotational axis to exceed a level of productive operation the controller, which is continuously receiving real time output signals on the level RPMs of the rotational axis and turbines, will issue a command to the electromagnetic braking device to partially engage thereby reducing the RPMs of the WPG's rotational axis to a level that allows for efficient production of electricity.

If the controller receives continuous signals from the wind speed sensor 80 indicating that the wind stream's velocity has risen to a level that could damage or destroy the WPG's turbines and other components of the system, a command is sent from the controller to the electromagnetic braking device to fully engage and hold the WPG's rotational axis in a fixed position. When signals from the wind speed sensors 80 being sent to the controller indicate that the velocity of the wind stream has returned to a level that will allow for the WPG's turbines to operate within an RPM range that is safe for the WPG's components to operate in and will allow for the effective production of electricity the controller sends a command to the electromagnetic braking device to partially disengage so as to allow for the rotational axis to rotate.

The wind turbines, the rotational axis, the permanent magnetic generator (PMG), the controller (and the various sensors and encoders connected to it), the inverter, the electromagnetic braking device and the bracketing and supporting fixtures used to hold the WPG's components in place and couple them to the Housing structure comprises the components of a wind power generator (WPG).

In some aspects of the invention a mechanical device, for example, a gearbox mechanism, a transmission or timing chain, is situated between the axis and the PMG's drive shaft, functioning to increase the speed of the drive shaft by a factor of two times or more through the conversion of torque power to higher speed through the use of gearing ratios.

The need for a gearbox-like speed up mechanism is based upon the size and type of turbine or turbines that are utilized to construct the wind power generator and the power rating and power/torque curve of the PMG with which it matched. If the PMG that is being utilized has a higher RPM (revolutions per minute) requirement for effectively producing electricity than the turbine or turbines can provide by direct application of the mechanical rotation they create, it is necessary to situate the gearbox-like speed up mechanism between the rotatable axis upon which the turbine or turbines are affixed and the drive shaft of the PMG. Depending upon the size and type of turbines in use and the RPM requirements of the PMG in use, the speed up mechanism may have a ratio ranging from 1:2 to 1:4 in order achieve the desired level of RPM's.

In aspects of the invention where the turbines' power/torque curve and RPM production capability is within the same range as that of the PMG that it has been matched with in the WPG (wind power generator) setup there is no need for any mechanical speed up to be placed between the turbine axis and the drive shaft of the PMG.

If the force of the passing air stream striking upon the impellers of the turbines is strong enough it will causes the axis to overcome the inertia of the physical equipment making up the wind power generator (WPG), causing the axis to rotate, thereby rotating the drive shaft of the PMG.

If the elements of the passing air stream that are collected, focused and directed at the WPGP are of, or increase to, a certain velocity, some of the energy contained in the elements of the air stream striking the turbine's impellers will be of a level of intensity that is great enough so as to overcome the inertia of the wind power generator's physical equipment and electromagnetic resistance of the PMG thereby causing the axis to rotate which in turn causes the PMG's drive shaft to rotate, either directly or via the gearbox or similar mechanical speed up device, and turn the generator's core.

If the elements of the collected, focused and directed wind stream reach a certain level of velocity, the amount of energy being extracted from the wind stream through the action of its striking against the turbine's impellers will be great enough to increase the revolutions per minute (RPMs) of the rotatable axis and drive shaft of the PMG to attain the number of revolutions per minute required for the generator to create DC electricity which is then converted to 'electric grid acceptable' AC electricity through the use of an inverter.

The number of revolutions per minute (RPMs) required to begin the generation of electricity by a wind power generator is determined by the level of cogging and torque resistance of any particular PMG that is utilized.

Once a wind power generator (WPG) has begun to generate electricity, increases in the wind stream's velocity will cause the WPG to produce greater amounts of electricity, while a fall in the wind stream's velocity will result in a decline in the amount of electricity being produced. If the wind stream's velocity falls below a certain level electricity production will cease.

The WPGP can include wind power generators that are based on either of the HAWT (horizontal axis wind turbine) or the VAWT (vertical axis wind turbine) technologies.

Regardless of whether a turbine is based on HAWT or VAWT technology, the wind power generator and the turbine or turbines must be structured on the basis of correlating and matching the swept area of a turbine or turbines impellers (blades, rotors) with the power generation rating of the permanent magnetic generator (PMG), or they are being matched with in the wind power generator. More simply put, the size of the 'swept area' of a turbine—the area that a turbine's rotors 'sweeps or collects air from'—can be converted over to a measure of 'aerodynamic DC watts' that a swept area of that size would generate at varying levels of wind velocity.

For the purposes of constructing a wind power generator the swept area of the turbine or turbines must be large enough to harvest a level of energy from the wind stream that provides a level of rotational mechanical power to the drive shaft of the PMG sufficient to generate electricity within that the PMG's power range.)

If HAWT based wind power generators are used to make up the WPGP's (wind power generation plant) wind power generators (WPGs), each individual wind power generator of the plurality of WPG's that make up the WPGP could be made up of one or more HAWTs coupled to either a supporting or suspending vertically or horizontally aligned pole that had either one or both ends of the pole secured in a rotatable socket with the socket being coupled to framing elements of the housing structure 10.

If VAWT based wind power generators are used to make up the WPGP's (wind power generation plant) wind power generators (WPGs), each individual wind power generator of the plurality of WPG's that make up the WPGP can be made up of one or more VAWTs affixed to a vertically aligned rotatable axis that has its top terminus secured in a rotatable socket with the socket being coupled to framing elements of the housing structure 10 while the bottom terminus, the end pointed towards the ground, is coupled to either a gearbox-like speed up mechanism which in turn is coupled to the drive shaft of a PMG, or the bottom terminus of the axis is directly coupled to the drive shaft of the PMG, with both the gearbox-like speed up mechanism, if used, and the PMG being supported and held in place by being bracketed and/or shelved to framing elements of the housing structure 10.

In aspects of the Invention where the WPGP is made up of WPGs (wind power generators) that are VAWT based there are three types of vertical wind turbines that may be utilized to construct the wind power generators, H-Type, C-Type and Darrieus Type turbines.

A VAWT based WPG constructed utilizing H-Type, C-Type or Darrieus Type turbines may be comprised of one or more turbines, each individual turbine being separately rotatably affixed to a common rotational axis with the axis being coupled to either a gearbox-like mechanical speed up device or directly to the drive shaft of the PMG that is being made a part of the WPG (wind power generator).

When a VAWT based WPG is constructed utilizing either H-Type, C-Type or Darrieus Type turbine and more than one turbine is employed to construct the WPG each individual turbine has its impellers (blades, rotors) offset from the impellers of the turbine that is adjacent to it on the rotational axis upon which they are coupled. If three or more VAWT turbines are utilized to construct a WPG all of the turbines utilized are coupled to the rotational axis in a fashion so as to ensure that each turbine's impellers are offset from the impellers of the turbine that is adjacent to it but that all the turbines coupled to the rotatable axis of the WPG their impellers offset from each other. Offsetting the turbine's impellers serves to reduce axial load bearing, stresses and vibratory forces which can cause excessive wear on the WPG's components including the axis' shafting, the turbines themselves, the PMG and the anchoring and supporting equipment holding the WPG in place. In addition, the stresses and vibratory forces cause excessive wear and can cause damage to the housing structure, so reduction in stress and vibration prevent premature wear and damage.

In a WPGP in which the WPGs are VAWT based, the size and number of turbines that comprise the WPGs are determined upon what is required to be the total nameplate power generation capacity, or power rating, of a particular aspect of the invention.

VAWT turbines, or the types described, ranging in size from 1 kW to 5 kW or more in power rating can be utilized to construct WPGs, and the WPGs can be comprised of one turbine or a plurality of turbines to achieve the required power rating for the selected system. As an example, four 5 kW turbines could be utilized to construct a WPG with a power rating of 20 kW with the WPG being equipped with a PMG that had a power rating in the range of 20 kW.

In turn, if the system according to an aspect of the invention required a nameplate power generation capacity of 500 kW then twenty-five 20 kW WPGs would be required to comprise a WPGP (wind power generation plant) of 500 kW. When a plurality of WPGs are required to achieve a certain nameplate capacity for the WPGP according to an aspect of the invention, the WPGs will be arranged in arrays, with the individual WPGs being set adjacent to one and other with certain distances of spacing and orientations of positioning between and amongst them being maintained to assure that each individual WPG is able to have productive elements of the air stream that has been collected, focused and directed into the central chamber in which the WPGs are situated striking against its impellers in an unimpeded fashion. The WPGs must be set at distances from one and other and at orientations to one and other that ensure, regardless of the angle of the incoming wind stream in relation to the position of the WPGs, that neither the impellers of any of the turbines are blocked by those of other turbines and neither the turbulence from any WPGs wake nor the partial depletion of the wind stream's energy significantly reduces the productivity of any of the WPGs in the WPGP.

When the system according to an aspect of the invention requires a nameplate power generation capacity of a certain rating, the WPGP may be comprised of WPGs of a certain kW rating and the number of WPGs needed to achieve the desired nameplate capacity may require that the WPGs be arrayed in two rows, one row being set towards the one opening of the central chamber and the second row being set in proximity to the opposite opening of the chamber.

When the system according to an aspect of the invention requires that the WPGs be set in arrays of two rows the rows must be set at a distance from one and other assure that each individual WPG is able to have productive elements of the air stream that has been collected, focused and directed into the central chamber in which the WPGs are situated striking against its impellers in an unimpeded fashion. The rows of WPGs must be set at distances from one and other and the individual WPGs in the different rows at orientations to one and other that ensure that regardless of the angle of the incoming wind stream in relation to the position of the WPGs that neither the impellers of any of the turbines are blocked by those of other turbines and the neither the turbulence from any WPGs wake nor the partial depletion of the wind stream's energy reduces the productivity of any of the WPGs in the WPGP.

In some aspects, it may be required to mix wind power generators (WPGs) of varying sizes and turbine types in the arrays and rows in which they may be set in the central chamber in order to optimize production. This would mean, as way of an example that WPGs comprised of a plurality of H Type turbines, having a rating of 10 kW and a diameter of 8 feet may be intermixed with WPGs comprised of C Type turbines, having a rating of 20 kW and a diameter of 11 feet, in either the same array and row, or in a fashion where one row of WPGs was made up of the WPGs comprised of the H Type turbines and the second row was made of the WPGs comprised of the C Type turbines.

In certain aspects, it may also be required that the turbines of the WPGs in one row be situated on the rotational axis of the WPG to allow an area of open space for the wind stream to flow through unimpeded in order to strike the impellers of a turbine of a WPG set in the second row and which is situated on the rotational axis of the WPG in such a position as to have its impellers struck directly by the elements of the unimpeded wind stream.

The invention has been described with reference to specific embodiments. One of ordinary skill in the art, however, appreciates that various modifications and changes can be made without departing from the scope of the invention as set forth in the claims. For example, the wind power generation plant housed in the central chamber located between the inlet and outlet chambers may be vertical-axis or horizontal-axis in design, with the rotation upon which the impact impellers are affixed being oriented in either a vertical or horizontal alignment in relation to the ground surface, with either orientation allowing for bi-directional functionality. Accordingly, the specification is to be regarded in an illustrative manner, rather than with a restrictive view, and all such modifications are intended to be included within the scope of the invention.

Benefits, other advantages, and solutions to problems have been described above with regard to specific embodiments. The benefits, advantages, and solutions to problems, and any element(s) that may cause any benefits, advantages, or solutions to occur or become more pronounced, are not to be construed as a critical, required, or an essential feature or element of any or all of the claims.

What is claimed is:

1. A bi-directional system for collecting, augmenting, and converting wind energy, comprising:
an open-ended elongated housing, comprising: a ceiling, a floor, and oppositely disposed side walls, said elongated housing forming:
a bi-directional airstream inlet chamber with an intake opening for collecting an airstream, said airstream inlet chamber comprising a first and second array of selectively adjustable louver panels forming oppositely disposed first and second side walls of said housing and an internal outlet through which a collected airstream passes;
a central chamber for housing a plurality of turbines, and for receiving said collected airstream from said internal outlet of said airstream inlet chamber, said plurality of turbines being rotatably coupled to an axis of rotation, said central chamber comprising a third and fourth array of selectively adjustable louver panels forming oppositely disposed third and fourth side walls of said housing;
a bi-directional airstream outlet chamber with an internal inlet through which said collected airstream passes from said central chamber, said airstream outlet chamber comprising a fifth and sixth array of selectively adjustable louver panels forming oppositely disposed fifth and sixth side walls, and an outlet opening;
an ancillary airstream injector disposed on an outer surface of said ceiling and on an outer surface of said floor adjacent said airstream inlet chamber and said airstream outlet chamber for collecting an accelerated airstream; and
a controller coupled to said axis of rotation and to said first, second, third, fourth, fifth and sixth array of adjustable louver panels for controlling movement of the adjustable louver panels and for converting the rotational energy output into mechanical or electrical energy,
wherein each adjustable louver panel of each of said arrays is coupled to a vertical axis that intersects and extends beyond a top end and a bottom end of each adjustable louver panel, each vertical axis being coupled together by a connector arm.

2. The system according to claim 1, wherein each array of adjustable louver panels is coupled to a shaft of an electric motor for moving each array independently.

3. The system according to claim 1, further comprising:
one or more berms located in an area surrounding said housing for directing an air stream flowing adjacent the ground into an open end of said housing.

4. The system according to claim 1, further comprising:
one or more adjustable airfoil deflectors disposed in an area surrounding said housing for directing an airstream flowing adjacent the ground into an open end of said housing.

5. The system according to claim 4, comprising a plurality of vertical axes, each of which has a plurality of turbines rotatably coupled thereto, said plurality of vertical axes being arranged in parallel.

6. The system according to claim 1, wherein said plurality of turbines is disposed on a vertical axis.

7. The system according to claim 1, further comprising an interior air stream diverter, said interior air stream injector comprising an array of freely-movable diverter panels.

8. The system according to claim 1, further comprising one or more remotely located wind speed sensors and wind directional sensors interconnected to a receiving station.

9. A bi-directional system for collecting, augmenting, and converting wind energy, comprising:
an open-ended elongated housing, comprising: a ceiling, a floor, and oppositely disposed side walls, said elongated housing forming:
a bi-directional airstream inlet chamber with an intake opening for collecting an airstream, said airstream inlet chamber comprising a first and second array of selectively adjustable louver panels forming oppositely disposed first and second side walls of said housing and an internal outlet through which a collected airstream passes;
a central chamber for housing a plurality of turbines, and for receiving said collected airstream from said internal outlet of said airstream inlet chamber, said plurality of turbines being rotatably coupled to an axis of rotation, said central chamber comprising a third and fourth array of selectively adjustable louver panels forming oppositely disposed third and fourth side walls of said housing;
a bi-directional airstream outlet chamber with an internal inlet through which said collected airstream passes from said central chamber, said airstream outlet chamber comprising a fifth and sixth array of selectively adjustable louver panels forming oppositely disposed fifth and sixth side walls, and an outlet opening;
an ancillary airstream injector disposed on an outer surface of said ceiling and on an outer surface of said floor adjacent said airstream inlet chamber and said airstream outlet chamber for collecting an accelerated airstream; and
a controller coupled to said axis of rotation and to said first, second, third, fourth, fifth and sixth array of adjustable louver panels for controlling movement of the adjustable louver panels and for converting the rotational energy output into mechanical or electrical energy; and
one or more wind speed sensors and one or more wind directional sensors disposed adjacent said inlet opening of said air stream inlet chamber, adjacent said central chamber, and adjacent said outlet opening of said air stream outlet chamber.

10. A method for collecting, augmenting, and converting the energy of an airstream into mechanical or electrical energy, comprising the steps of:
providing an open-ended elongated housing, comprising: a ceiling, a floor, and oppositely disposed side walls,
collecting and concentrating an airstream through an airstream inlet chamber with an intake opening for collecting an air stream, said airstream inlet chamber comprising a first and second array of selectively adjustable louver panels forming oppositely disposed first and second side walls of said housing and an internal outlet through which a collected airstream passes;
disposing an ancillary airstream injector on an outer surface of said ceiling and on an outer surface of said floor adjacent said airstream inlet chamber and an airstream outlet chamber for collecting an accelerated air stream;
engaging a plurality of turbines disposed in a central chamber for receiving said collected airstream from said internal outlet of said airstream inlet chamber, said plurality of turbines being rotatably coupled to an axis of rotation, said central chamber comprising a third and fourth array of selectively adjustable louver panels forming oppositely disposed third and fourth side walls of said housing;

diffusing the collected and concentrated airstream through said airstream outlet chamber with an internal inlet through which said collected and concentrated airstream passes from said central chamber, said airstream outlet chamber comprising a fifth and sixth array of selectively adjustable louver panels forming oppositely disposed fifth and sixth side walls, and an outlet opening; and selectively adjusting the direction of each of said array of selectively adjustable louver panels, wherein each of adjustable louver panel of each of said arrays is coupled to a vertical axis that intersects and extends beyond a top end and a bottom end of each adjustable louver panel, each vertical axis being coupled together by a connector arm.

11. The method according to claim 10, further comprising the step of:
forming one or more berms in an area surrounding said housing for directing an airstream flowing adjacent the ground into an open end of said housing.

12. The method according to claim 10, further comprising the step of:
disposing one or more adjustable airfoil deflectors in an area surrounding said housing for directing an airstream flowing adjacent the ground into an open end of said housing.

13. The method according to claim 10, wherein said plurality of turbines is disposed on a vertical axis.

14. The method according to claim 13, further comprising the step of:
providing a plurality of vertical axes, each of which has a plurality of turbines rotatably coupled thereto, said plurality of vertical axes being arranged in parallel.

15. The method according to claim 10, further comprising the step of:
providing an interior airstream diverter, said interior airstream injector comprising an array of freely-movable diverter panels.

16. The method according to claim 10, further comprising the step of:
disposing one or more wind speed sensors and wind directional sensors in a remote location, said sensors being interconnected to a receiving station.

17. A method for collecting, augmenting, and converting the energy of an airstream into mechanical or electrical energy, comprising the steps of:
providing an open-ended elongated housing, comprising: a ceiling, a floor, and oppositely disposed side walls, collecting and concentrating an airstream through an airstream inlet chamber with an intake opening for collecting an air stream, said airstream inlet chamber comprising a first and second array of selectively adjustable louver panels forming oppositely disposed first and second side walls of said housing and an internal outlet through which a collected airstream passes;

disposing an ancillary airstream injector on an outer surface of said ceiling and on an outer surface of said floor adjacent said airstream inlet chamber and an airstream outlet chamber for collecting an accelerated air stream;

engaging a plurality of turbines disposed in a central chamber for receiving said collected airstream from said internal outlet of said airstream inlet chamber, said plurality of turbines being rotatably coupled to an axis of rotation, said central chamber comprising a third and fourth array of selectively adjustable louver panels forming oppositely disposed third and fourth side walls of said housing;

diffusing the collected and concentrated airstream through said airstream outlet chamber with an internal inlet through which said collected and concentrated airstream passes from said central chamber, said airstream outlet chamber comprising a fifth and sixth array of selectively adjustable louver panels forming oppositely disposed fifth and sixth side walls, and an outlet opening; and disposing one or more wind speed sensors and one or more wind directional sensors adjacent said inlet opening of said airstream inlet chamber, adjacent said central chamber, and adjacent said outlet opening of said airstream outlet chamber.

18. The method according to claim 17, further comprising the step of:
disposing one or more wind speed sensors and wind directional sensors in a remote location, said sensors being interconnected to a receiving station.

19. The method according to claim 17, further comprising the step of:
disposing one or more adjustable airfoil deflectors in an area surrounding said housing for directing an airstream flowing adjacent the ground into an open end of said housing.

20. The method according to claim 17, wherein said plurality of turbines is disposed on a vertical axis.

* * * * *